United States Patent [19]

Nelson

[11] 4,188,610

[45] Feb. 12, 1980

[54] METHOD OF AND APPARATUS FOR THE GENERATION AND TRANSMISSION OF SIGNALS FOR ECHOLOCATION AND OTHER SIGNALLING PURPOSES, SUCH AS IN GEOPHYSICAL EXPLORATION

[75] Inventor: David E. Nelson, Rochester, N.Y.

[73] Assignee: Hydroacoustics, Inc., Rochester, N.Y.

[21] Appl. No.: 828,698

[22] Filed: Aug. 29, 1977

[51] Int. Cl.² ............................ G01V 1/14; G01V 1/28
[52] U.S. Cl. ................................ 367/14; 343/17.2 PC; 367/42; 367/23
[58] Field of Search ............... 340/15.5 TA, 15.5 CC, 340/15.5 SC; 343/17.2 PC

[56] References Cited

U.S. PATENT DOCUMENTS

| | | | |
|---|---|---|---|
| 2,808,577 | 10/1957 | Crawford et al. | 340/15.5 TA |
| 3,326,320 | 6/1967 | Forester | 340/15.5 TA |
| 4,004,267 | 1/1977 | Mayne | 340/15.5 CP |
| 4,037,190 | 7/1977 | Martin | 340/15.5 TA |
| 4,047,173 | 9/1977 | Miller | 343/17.2 PC |

*Primary Examiner*—Nelson Moskowitz
*Attorney, Agent, or Firm*—Martin LuKacher

[57] ABSTRACT

Methods and apparatus are described for generating and transmitting signals in accordance with a sequence which defines the time relationship of the signals. Each signal has a band width covering several octaves and may be a pulse. During a transmission interval the repetition frequencies of the signals monotonically sweep in a coherent relationship over bands restricted to an octave such that the spectrum of the sequence has substantially constant energy over a frequency range much larger than an octave. The autocorrelation function of the sequence is characterized by an absence of side lobes which would indicate false targets or produce a high noise level upon processing of the signals in an echolocation system, such as a geophysical exploration system in which the seismograms are constructed by cross correlation of the signals which are received from the geological reflection surfaces with a stored replica of the transmitted signals. The signals can be generated by a plurality of sources all of which operate during the transmission interval, thus enabling the transmission of increased energy into the medium (viz., the seismic signal power injected into the earth).

87 Claims, 23 Drawing Figures

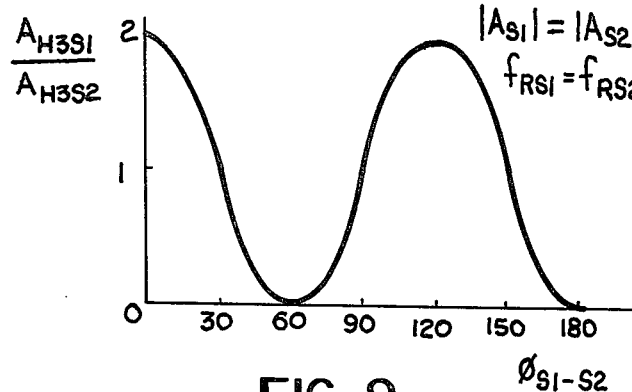
FIG. 9
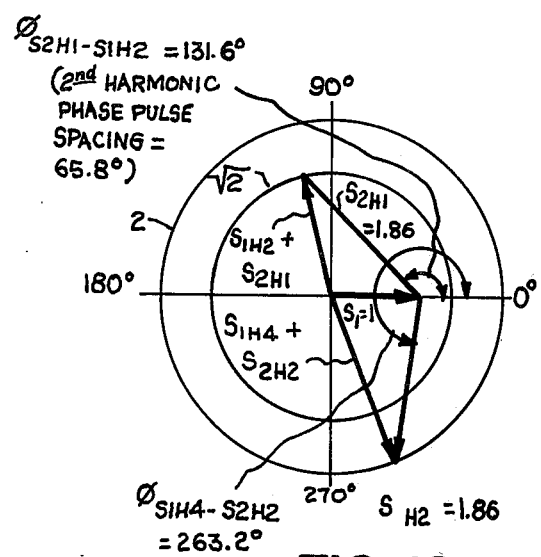
FIG. 10
FIG. 11
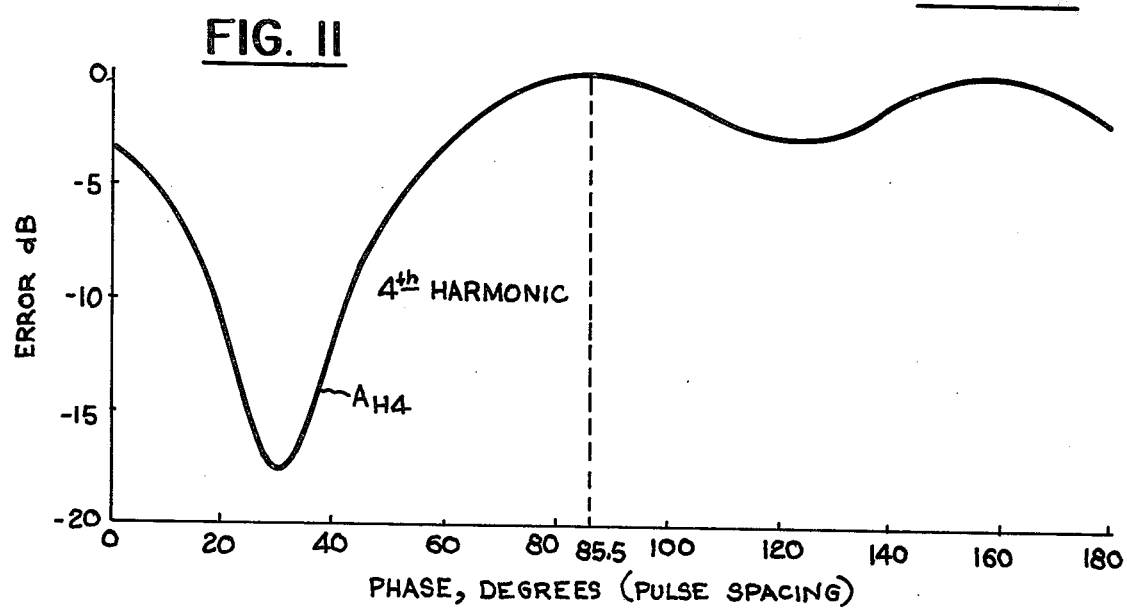
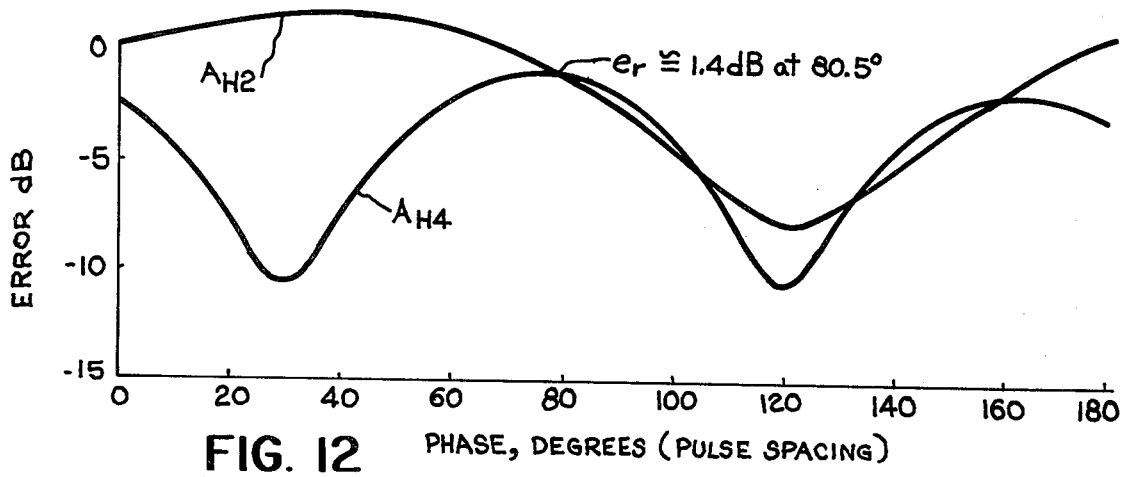
FIG. 12

METHOD OF AND APPARATUS FOR THE GENERATION AND TRANSMISSION OF SIGNALS FOR ECHOLOCATION AND OTHER SIGNALLING PURPOSES, SUCH AS IN GEOPHYSICAL EXPLORATION

The present invention relates to methods of and apparatus for generating and transmitting signals in accordance with a predetermined sequence such that the sequence of signals exhibits a relatively smooth power spectrum extending over a broad frequency band useful for high resolution echolocation and other signaling purposes.

The invention is especially adapted to and suitable for generation of seismic signals for use in geophysical exploration systems and relates particularly to the transmission of such signals in the form of pulses, as may be produced by impact events in marine environments or on land, the repetition frequency of which may be swept over a range of frequencies during a transmission interval.

Methods and apparatus for the generation and transmission of seismic signals in the form of repetition-frequency modulated trains of pulses resulting from impact events are described in a related application filed in the U.S. Patent Office on Oct. 7, 1976 in the name of John V. Bouyoucos and assigned to the same assignee as the present application. This earlier filed U.S. patent application has been assigned Ser. No. 730,752 and is now U.S. Pat. No. 4,147,228 issued Apr. 3, 1979.

When repetition-frequency modulated trains of pulses are transmitted, they are accompanied by harmonics which extend over frequency ranges harmonically related to the range over which the repetition frequency of the pulses themselves are swept. For example, when pulses are swept over a repetition-frequency range from 10 to 20 Hz, the harmonics of these pulses sweep over bands which extend from 20 to 40 Hz in the case of the second harmonic, from 30 to 60 Hz in the case of the third harmonic, from 40 to 80 Hz in the case of the fourth harmonic, and so forth. These harmonics combine with the fundamental to form the power spectrum of the signals. Whenever any harmonics contribute to any specific frequency of the power spectrum more than once, undulations of the spectrum appear. These undulations frequently have the appearance of "grass". The undulations in the spectrum may also give a false target indication if the harmonic components of the same frequency should correlate strongly with each other at displaced times, appearing as side lobes in the cross correlation function of the transmitted and received signals. The undulating spectrum also may provide a continuous high side lobe level which appears as noise in the seismogram. The net effect is derogation of the level of resolution and signal-to-noise ratio of the geological reflection surfaces in the resulting seismogram.

It is a feature of this invention to provide methods and apparatus for generating and transmitting signals which contain spectral energy in each and every frequency band within the range of frequency useful in the echolocation or other systems in which the signals are employed, which in the case of seismic exploration systems is that range of frequencies which is necessary and desirable for penetration of high resolution seismic energy deeply into the earth. This spectral energy is, however, produced so that its spectral components will appear only once during a transmission interval.

It is an aim of the invention to provide methods of and apparatus for generating the spectral energy over the frequency range used by the echo ranging and location system at high spectral levels without introducing degrading undulations in the spectrum, and nevertheless augmenting the energy in each frequency increment within the range so as to equalize the spectral energy and provide a constant or substantially flat spectrum.

It is known that the autocorrelation function of a signal is the Fourier transform of its power spectrum and that the Fourier transform of a constant or flat power spectrum is a narrow pulse or main lobe surrounded by little side lobe energy. A flat power spectrum as provided by this invention is especially suitable for pulse compression echolocation systems and is highly desirable for seismic exploration systems in that high resolution of the geological reflection surfaces and few false reflection indications are then obtained in the resulting seismograms.

It has heretofore been suggested to use various pulse sequences or codes in order to improve the autocorrelation function of signals used in seismic exploration systems (see Barbier and Viallix, "Pulse Coding in Seismic Prospecting—Sosie and Seiscode", Geophysical Prospecting, 22, 153-175 (1974), and U.S. Pat. Nos. 3,264,606; 3,483,514; 3,811,111; 3,866,174; 3,956,730). These pulse sequences or codes are random in nature and incompatible with practical sources which can be used in geophysical exploration systems. The power level which can be transmitted over a given transmission interval is limited because of the random nature of these sequences or codes. The above-mentioned related application filed in the name of John V. Bouyoucos discloses efficient sequences of seismic signals which may be used for the transmission of high power spectral energy with the mean spectral level extending with substantial uniformity over the frequency range of interest.

This invention provides substantial improvements in the generation and transmission of pulse signals in that undulations of "grass" which may appear in the spectrum are reduced while maintaining the spectrum level constant throughout the frequency range of the location system which utilizes the signals, and while maximizing the number of pulses, and hence the power that can be transmitted in a given time interval; thus providing a result not heretofore obtainable with these aformentioned pulse coding methods and apparatus.

While the aforementioned related application, which was filed in the name of John V. Bouyoucos, describes methods and apparatus whereby the mean spectrum level may be made constant over the frequency range of interest, there may, nevertheless, be undulations in the spectrum in that augmentation is accomplished by the incoherent summation of signals from different sources. The present invention provides methods and apparatus whereby requisite augmentation may be obtained coherently, without introducing undulations in the spectrum.

Accordingly, it is an object of the present invention to provide improved methods of and apparatus for generating and transmitting signals for echolocation, such as in seismic exploration and for other signalling purposes.

It is another object of the present invention to provide improved methods of and apparatus for generating and transmitting signals for use in pulse compression echolocation and other signalling systems and particularly where the signals vary in repetition frequency (viz., are repetition frequency modulated).

It is a further object of the present invention to provide methods of and apparatus for generating a sequence of signals having a substantially constant spectrum level over a frequency range through the use of individual pulses or other signals having individually a broad bandwidth such that spectral components of the individual pulses or other signals extend throughout the frequency range.

It is a still further object of the present invention to provide improved methods of and apparatus for transmitting signals such as seismic signals and other signals useful for echolocation and other purposes which have autocorrelation functions characterized by a narrow pulse or main lobe at a reference time and no significant side lobes.

It is a still further object of the present invention to provide, through the methods of and apparatus for generating signals utilizing a multiplicity of sources, a sequence of signals that can be transmitted over a short time interval at high energy and nevertheless obtain a substantially flat spectrum over the desired frequency range.

It is a still further object of the present invention to provide improved methods of and apparatus for generating seismic signals through the use of pulses which cover individually a frequency spectrum much greater than the range of repetition frequency over which the pulses may be swept.

It is a still further object of the present invention to provide improved methods of and apparatus for generating seismic signals or other signals for use in echo ranging and location systems wherein spectral energy at a constant level is obtained over a frequency range equal to a multiple of the range of repetition frequencies of the signals.

It is a still further object of the present invention to provide improved methods of and apparatus for transmission of seismic signals, used in seismic exploration systems which operate by cross correlation techniques, which result in a reduction of false responses due to non-linearities in the transmission medium (viz., the earth), the source of the signals, or in the coupling between the source and the transmission medium.

It is a still further object of this invention to provide improved methods and apparatus for generating improved sequences of signals which are slowly varying, quasi repetitive sequences as contrasted with random sequences of signals, which slowly varying signals can be transmitted by practical sources, such as electrohydraulic, pneumatic and electromechanical sources.

It is a still further object of the invention to provide improved methods and apparatus for generating slowly varying, quasi repetitive sequences which result in higher power and higher transmitted energy over a given time interval than random sequences.

Briefly described, a method of transmitting signals in accordance with the invention utilizes a multiplicity of sources of pulses. These sources may be seismic generators of impact events such as described in the above-mentioned related application filed in the name of John V. Bouyoucos. Each source provides a multiplicity of pulses in a train. The pulses in the train are quasi-repetitive; that is, they are never repeated with the same period, and the period between the pulses changes continuously as the train evolves in time. Each train is substantially identical. The repetition frequency for each of the trains sweeps over the same frequency band which is one octave in extent. The starting time for each train is slightly different, and adjusted as described hereinafter. In this manner, the pulses from the plurality of trains do not occur at the same time, but instead subdivide the period of the repetition frequency into parts whose proportionment remains constant over the duration of the transmission. The number of parts is generally equal to the number of trains.

The proportionment of the period of the repetition frequency cause the harmonics of the repetition frequency to be adjusted in amplitude such that those harmonics which are at octave steps from the fundamental, namely at repetition frequencies twice, four times, eight times, etc., times the repetition frequency of the fundamental, are augmented, while these harmonics which are not at octave steps, namely those at three times, five times, etc. the repetitive frequency at the fundamental, are substantially eliminated. The non-octave harmonics can produce frequency components at the same frequencies produced by the octave harmonics but at a different time, which cause undulations in the spectrum. Non-octave harmonic repetition rates are avoided in accordance with this invention.

As the octave harmonics sweep through each respective octave during the transmission, the sweep rate of each higher order harmonic is greater, due to the fact that higher order octaves have wider bandwidth than lower order octaves. Since the sweep times are all identical, namely the transmission time, a reduction of spectral level is experienced at the higher octaves if the octave harmonic amplitudes are identical. The timing proportionments described hereafter cause the amplitudes of the octaves harmonics to be augmented to offset the spectral reduction caused by the sweep rate differences. In this manner, each successive octave is caused to have a spectral level identical to its predecessor.

The frequency sweep rate throughout the transmission and the amplitude of the pulses combine to determine if the spectrum is constant, or "flat", within one octave. Several means to achieve the required flatness are discussed in the above-mentioned related patent application in the name of John V. Bouyoucos, Ser. No. 730,752 filed Oct. 7, 1976. As an example, one technique is to cause the amplitude of the pulses to be constant throughout the duration of the transmission, and to employ a frequency sweep known as "linear period modulation". In accordance with this invention, linear period modulation may be used with the period of the fundamental repetition frequency changing by a factor of 2:1 over the duration of the transmission, sweeping monotonically in a manner linearly related to the transmission time.

When the succession of steps as described heretofore are employed to generate the sequence of pulses, the result is a spectrum composed of equal level, flat, non-undulating, contiguous octave bands, creating the desired constant continuous spectrum over the full frequency range of the signaling system.

In another embodiment of this invention, presently less preferred than the above, the repetition frequency of each train is swept over a different frequency band, each band not exceeding one octave in extent. The octave of the range over which the repetition frequency of the first of these trains is swept covers the lower portion of the range. The first source may operate over a range, for example, from 10 to 20 Hz which is the fundamental repetition frequency range. The other sources operate at repetition frequencies which are at harmonics of the repetition frequency of the first train of pulses, namely at repetition frequencies twice, three times, four times, five times . . . the repetition frequencies of the first train. Each successive train is adjusted in time such that the phase of the fundamental spectral component of that train is phase displaced by either zero degrees, in the case of octave harmonics, or by 180 degrees, in the case of non-octave harmonics, with respect to the phase of the corresponding harmonic spectral component of the first or fundamental train. The amplitudes of the trains are furthermore adjusted so as to augment the octave harmonics and eliminate the non-octave harmonics, providing the same spectral structure as described in the preferred embodiment.

In general, the invention provides methods and apparatus for transmitting a sequence of signals for use in echolocation and other signalling systems. The signals each have a spectrum extending over a frequency range of more than one octave, and may be pulses. Successions of such signals are repeatedly generated wherein the signals divide the duration of each succession in the same proportion. The duration of each succession is changed during a transmission interval by a factor not exceeding two-to-one; the proportions into which the durations of the succession are divided by the signals remaining the same. The change in duration is carried out slowly and monotonically such that each change is much less than the duration of the succession. The spectrum of the sequence which is transmitted has substantially constant energy which extends over the major part of the frequency range of the signals.

The signals which make up the repeated successions may be generated as trains which are combined to form the sequence.

The foregoing and other features, objects, and advantages of the present invention as well as the mode of operation and the presently preferred embodiment thereof will become more apparent from a reading of the following specification in connection with the accompanying drawings in which FIG. 1 is a waveform illustrating two successive pulses of a train of pulses generated in accordance with the invention and showing the fundamental and second harmonic components resulting from the train;

Figure 3:
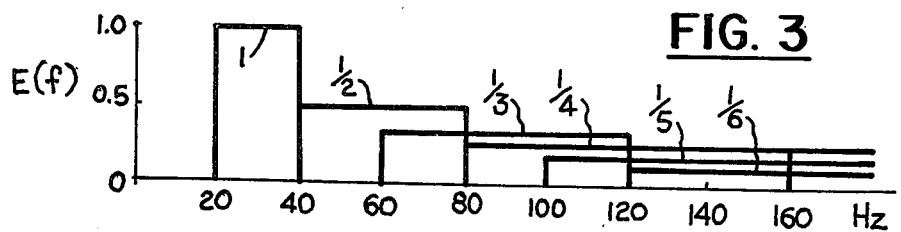
FIG. 3 is a diagram illustrating harmonically related bands or panels resulting from a sweep in the repetition frequency of a train of pulses, such as the pulses shown in FIG. 1, where the sweep in repetition frequency is from 20 to 40 Hz.
Figure 4:
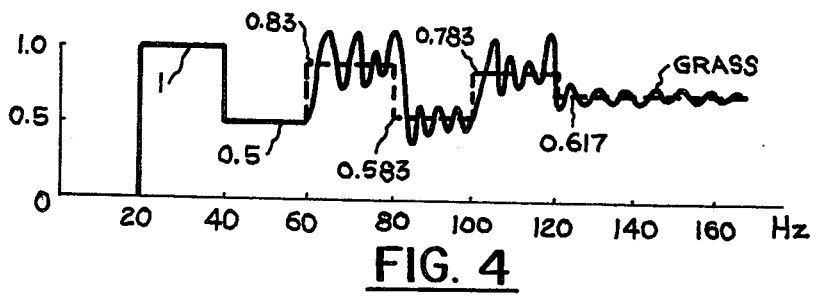
FIG. 4 is a diagram illustrating the energy spectrum which results from the summation of the panels shown in FIG. 3 wherein the dashed lines illustrate the mean spectral level in the frequency region where the summation results in undulations in the spectrum, which undulations are otherwise known as "grass"
Figure 5:
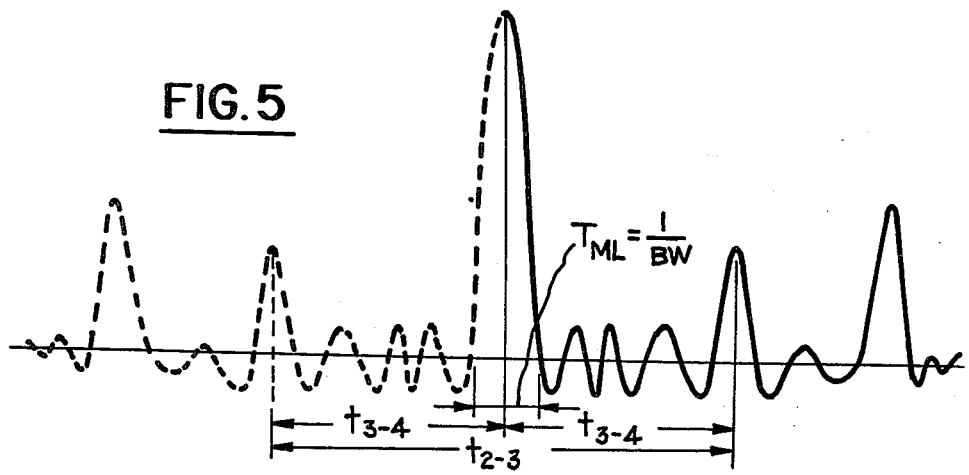
FIG. 5 is a diagram illustrating the autocorrelation function of a signal having a spectrum similar to the spectrum shown in FIG. 4.
Figure 6:
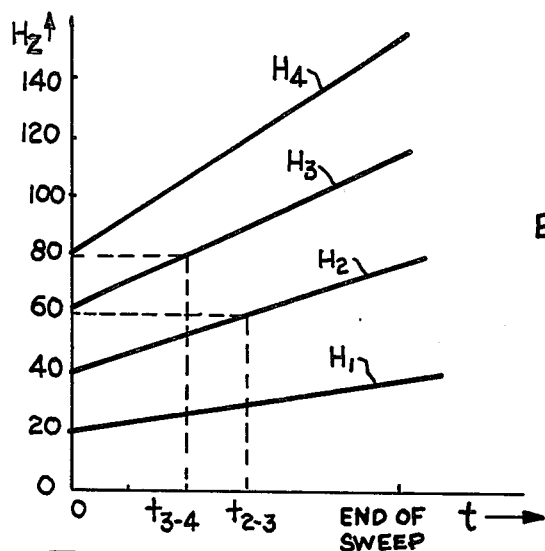
Figure 8:
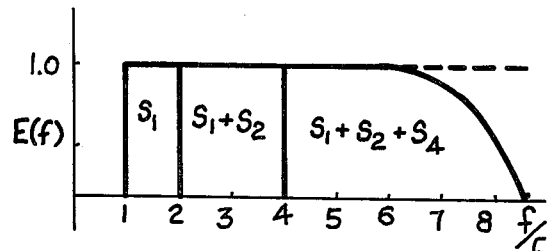
Figure 7A:
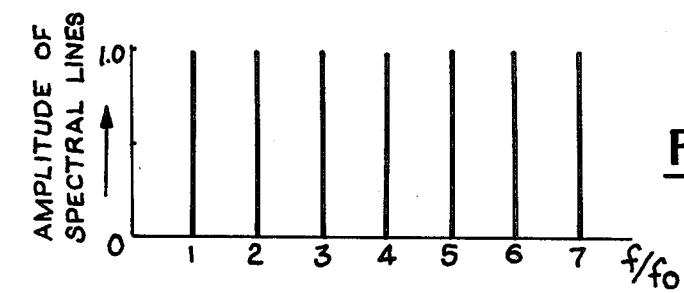
Figure 7B:
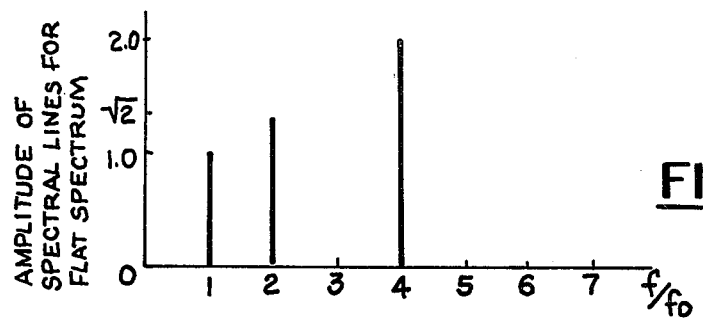
Figure 7C:
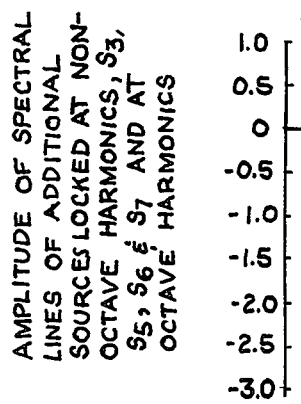
Figure 7C:
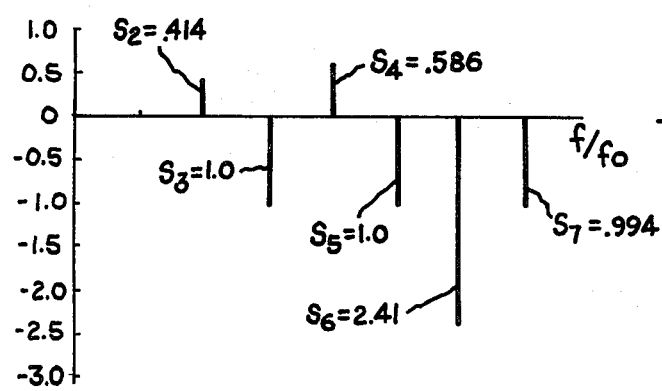

FIG. 6 is a series of curves illustrating the sweep in frequency of harmonic spectral components which make up the spectrum illustrated in FIGS. 3 and 4 and showing the time displacements with respect to the beginning of the sweep where different ones of these components correlate with each other so as to produce side lobes and false target responses in the autocorrelation function which is shown in FIG. 5;

FIGS. 7A through 7C are diagrams illustrating the amplitudes of harmonically related spectral components of signals which may be in the form of repetitive trains of impulses, which are shown individually in FIGS. 7A and 7C, and combined in FIG. 7B;

FIG. 8 is a diagram illustrating the flat spectrum resulting from the signals shown in FIG. 7B; when the repetition frequency of the signals is swept such that their periods change linearly during the transmission interval (i.e., linear period modulation).

FIG. 9 is a diagram illustrating the amplitude of the third harmonic spectral component resulting from trains of repetitive pulses, which are repetitive at the same frequency, with respect to the phase displacement between these trains;

FIG. 10 is a vector diagram for a set of vectors representing harmonic components of a fundamental and second harmonic repetitive trains of pulses which, when summed, provide augmentation of octave harmonic components to the desired extent for obtaining a flat spectrum;

FIG. 11 is a curve showing the error in the amplitude of the fourth harmonic component from its desired amplitude for a flat spectrum when such component is generated by first and second sources of repetitive trains of pulses which sweep over bands which are fundamental and second harmonic octaves; the error being plotted as a function of one-half of the phase displacement between the second harmonic spectral component of the pulses from fundamental source and the fundamental spectral component of the pulses from the second harmonic source.

FIG. 12 is a curve illustrating the error in the amplitude of the second harmonic and fourth harmonic components from their desired amplitudes for a flat spectrum, when such components are generated by use of first and second sources which produce repetitive trains of pulses of equal amplitude which sweep over bands which are fundamental and second harmonic octaves, the error being plotted as a function of one-half of the phase displacement between the second harmonic spectral component of the pulses from the fundamental source and the fundamental spectral component of the pulses from the second harmonic source.

Figure 13:
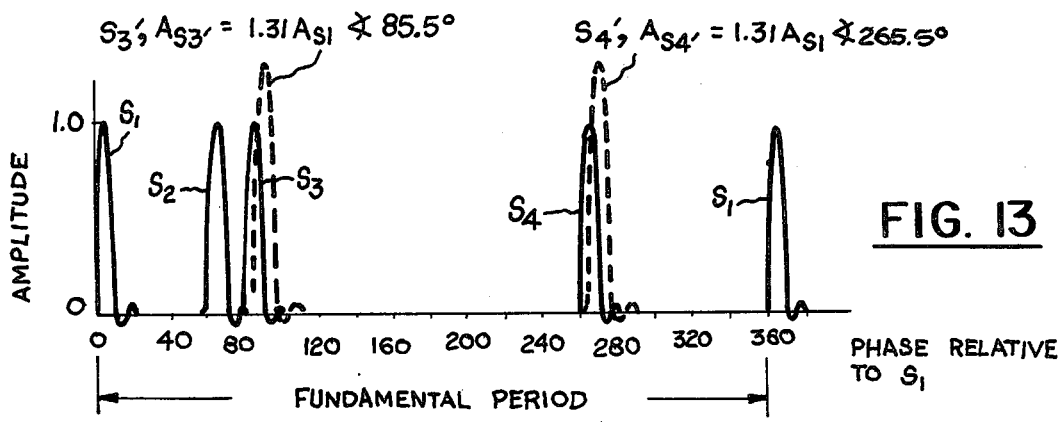
Figure 14:
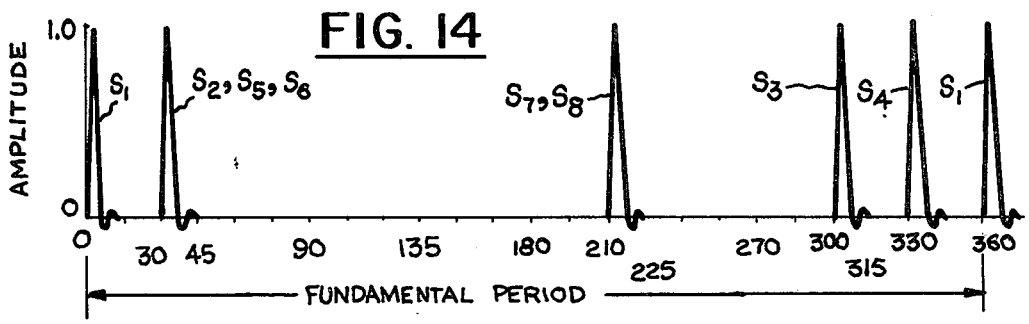
Figure 15:
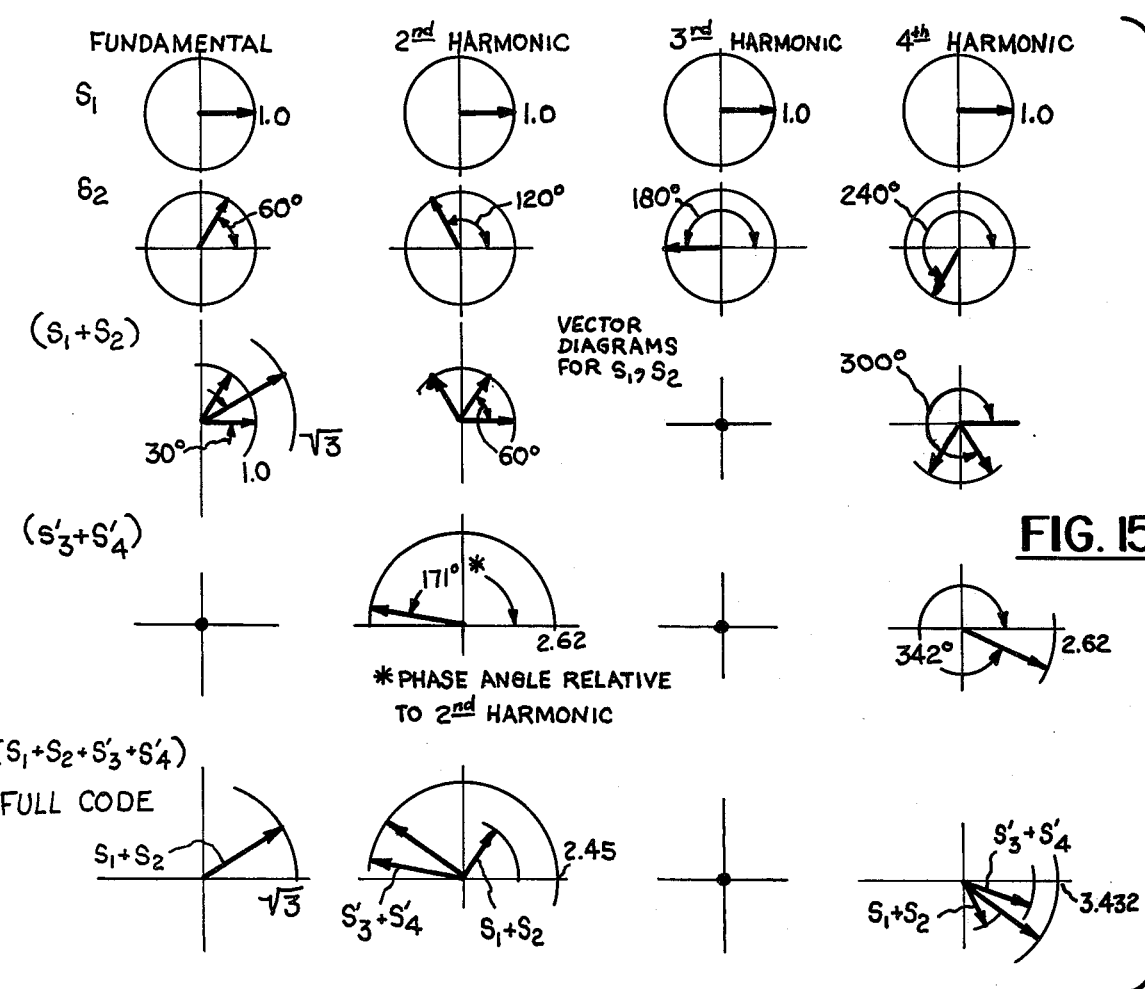
Figure 16:
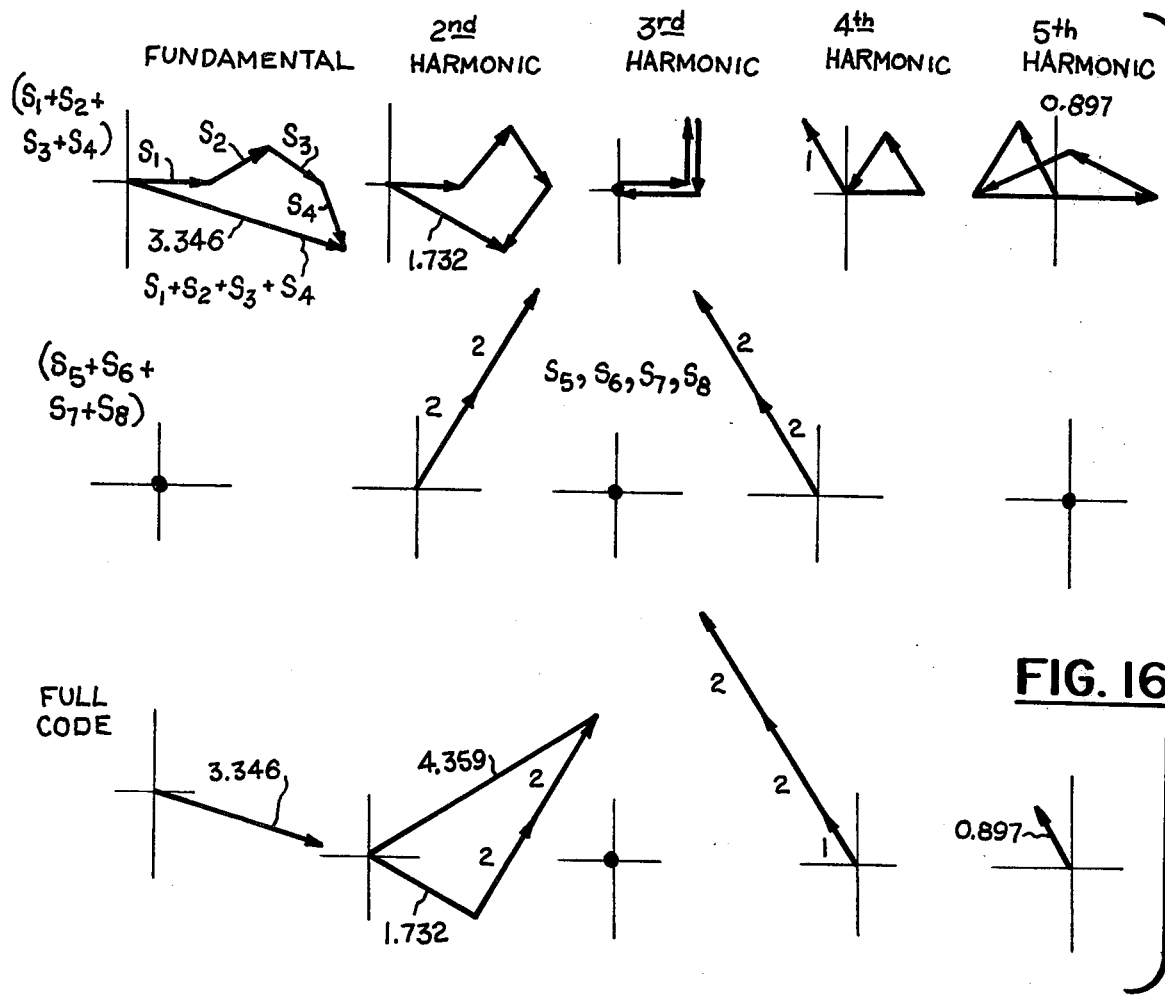

FIG. 13 is a waveform diagram illustrating the succession of pulses resulting from the operation of four sources of repetitive trains of pulses as such pulses appear during a repetition period of the train from a first of these sources which sweeps over a fundamental octave;

FIG. 14 is a waveform diagram similar to FIG. 13 showing a succession of pulses, during the repetition period of the train from the first source which sweeps over the fundamental octave, which are pulses generated by eight different sources, each of which generates a separate train of pulses;

FIG. 15 is a set of vector diagrams showing the augmentation and elimination of the harmonic spectral components in the transmission resulting from the pulses illustrated in FIG. 13;

FIG. 16 is a set of vector diagrams illustrating the augmentation and reduction in the amplitudes of the harmonic spectral components in the transmission resulting from the pulses shown in FIG. 14.

Figure 17:
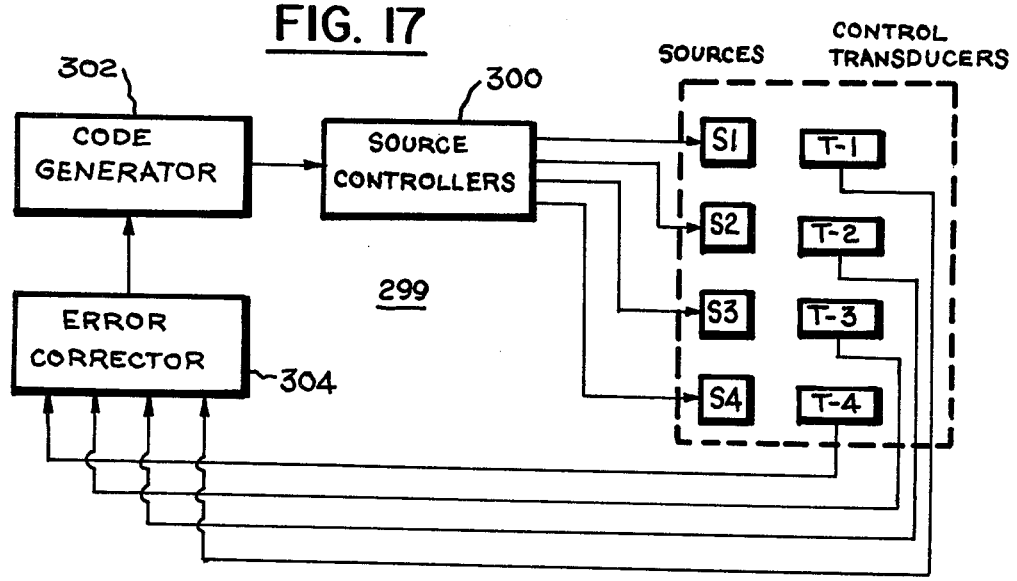
Figure 18:
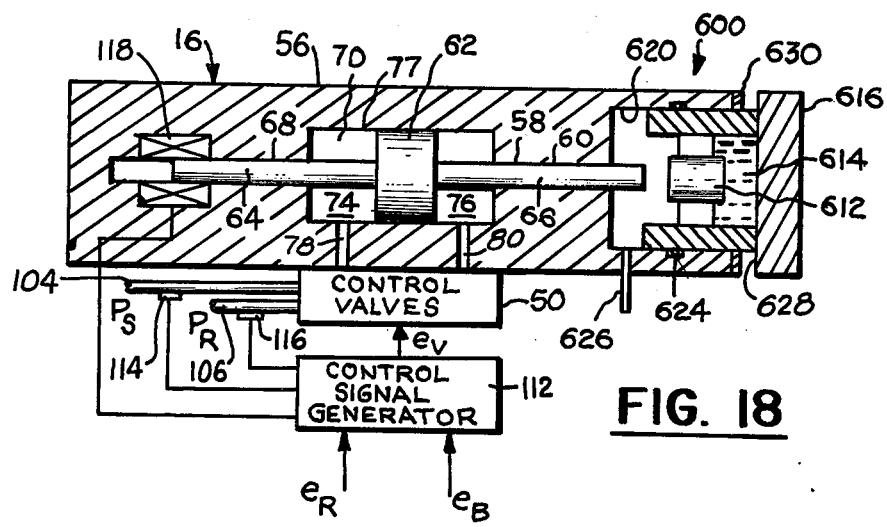
Figure 19:
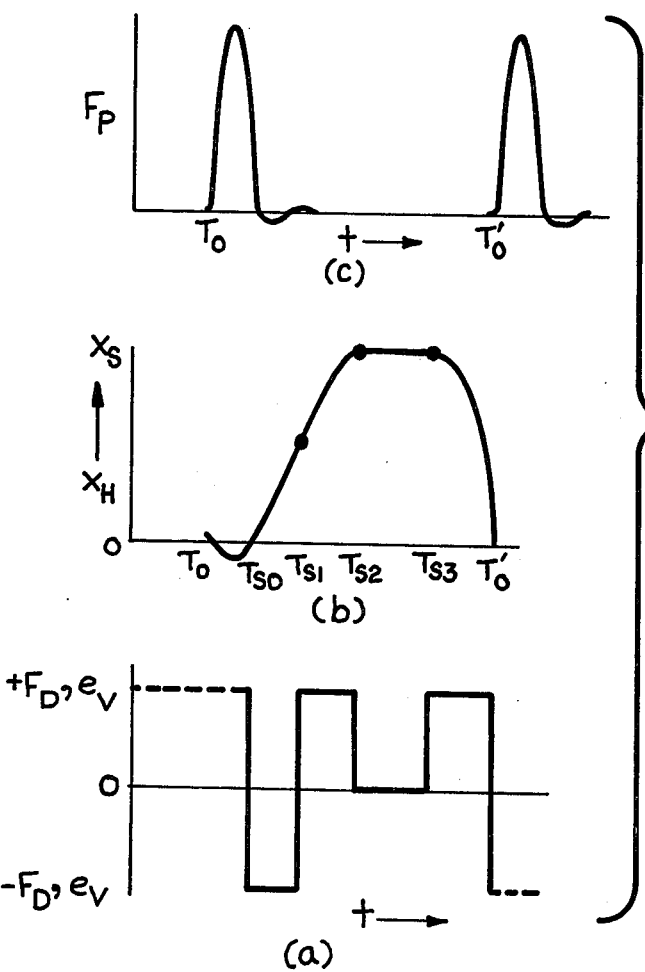
Figure 20:
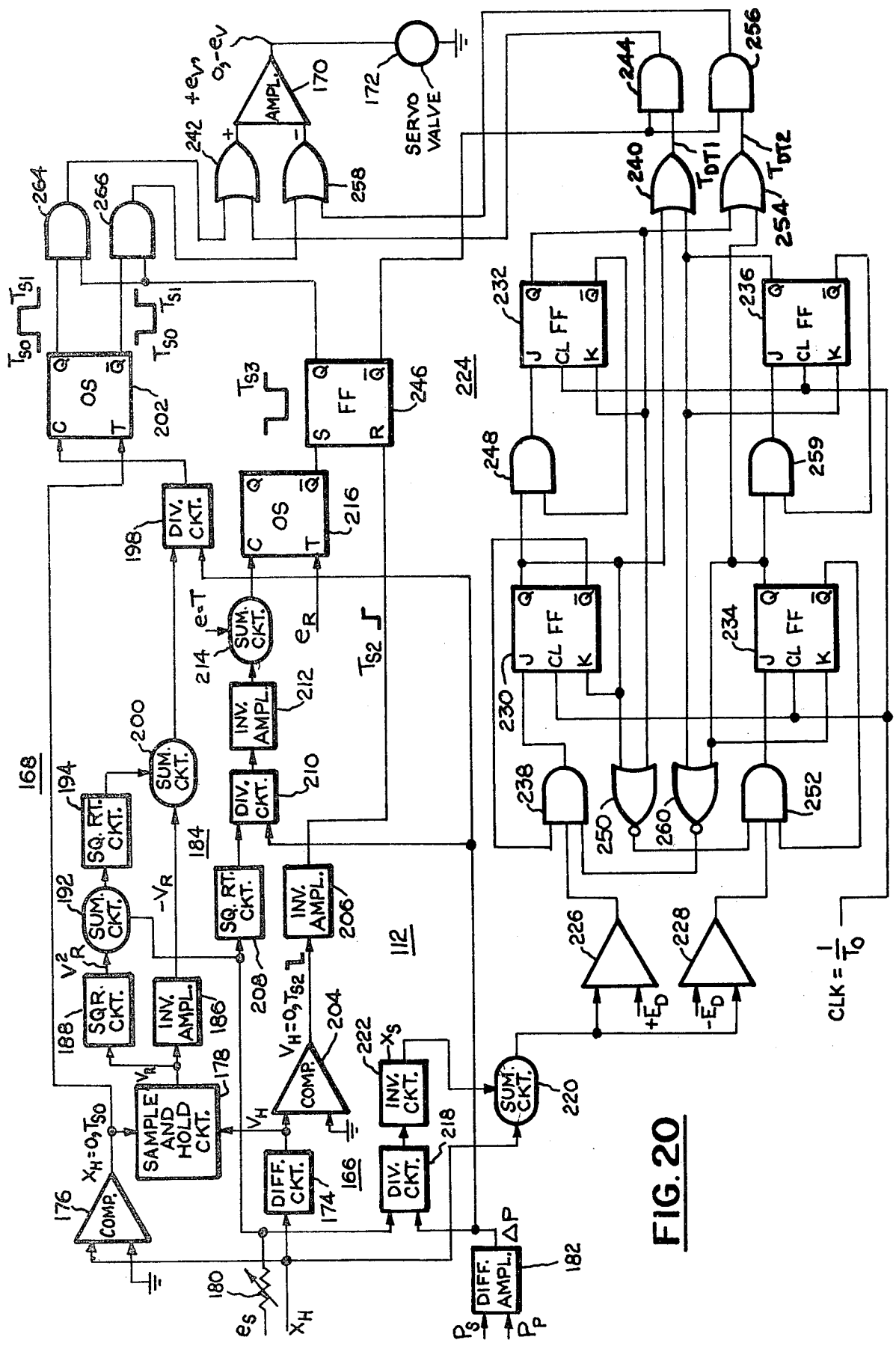
Figure 21:
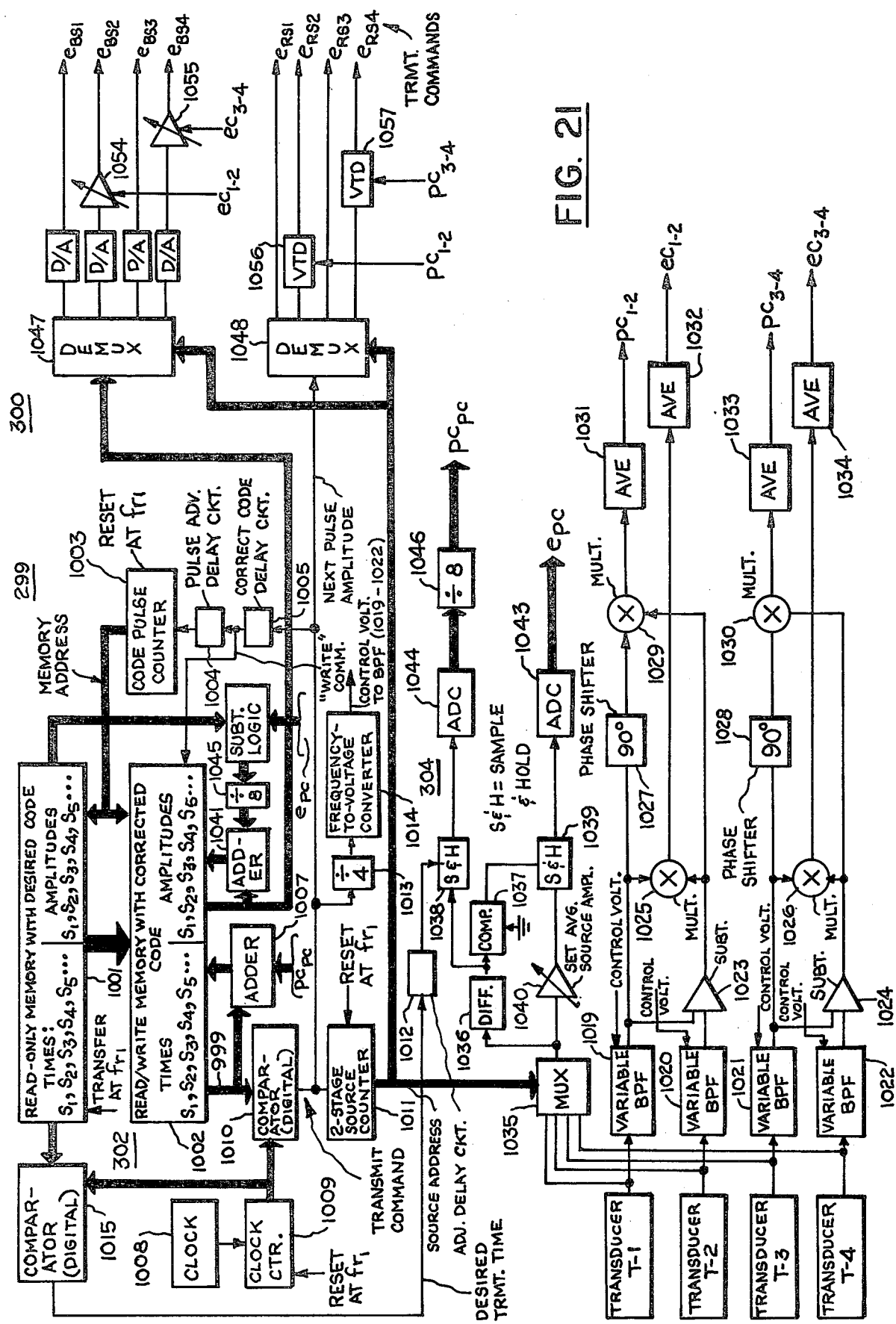

FIG. 17 is a block diagram illustrating an apparatus incorporating a plurality of sources which produce signals for use in seismic exploration systems, which apparatus embodies the invention;

FIG. 18 is a diagrammatic sectional view illustrating a source suitable for use in the apparatus shown in FIG. 17;

FIG. 19 shows timing diagrams which illustrate the time relationship of control signals for operating the source shown in FIG. 18 with respect to the displacement of a hammer in the source which produces pulses by generating and shaping impact events and also with respect to such pulses;

FIG. 20 is a block diagram schematically illustrating control signal generators which may be incorporated in the sources shown in FIG. 18 for generating the signals which control the control valves thereof; and FIG. 21 is a block diagram illustrating the code generator, source controller, and error corrector apparatus which may be used in the system shown in FIG. 17.

Figure 1:
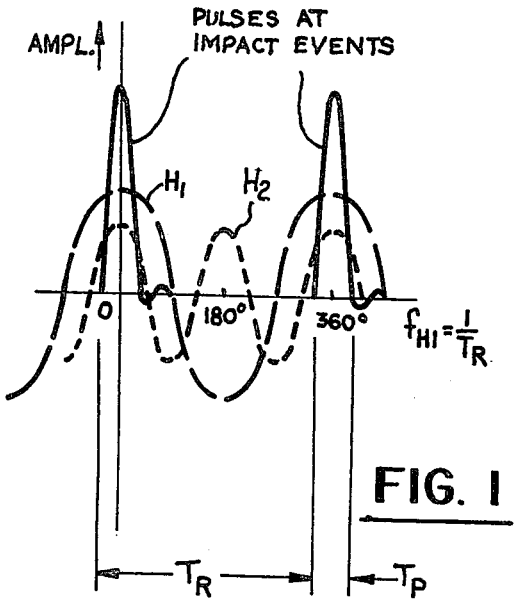

Referring more particularly to FIG. 1, there is shown a pair of successive pulses which are present in a train of pulses produced by a pulse source, such as will be described hereinafter in connection with FIG. 18. These pulses may be produced by impact events as when the hammer or ram in a source is driven into impact with an anvil or plate. This anvil or plate may be coupled through a force pulse shaping spring to a plate which is in contact with the ground, or in the case of a marine environment, in contact with the water. Other seismic sources may be used to geneate pulses. These may include pistons which are actuated by a sea water head (see, for example, John V. Bouyoucos, U.S. Pat. No. 3,277,437, issued Oct. 4, 1966). It is, however, necessary that these souces be capable of producing a multiplicity of pulses which can be varied or swept in repetition frequency over frequency ranges including at least the lower range of desired frequency transmission. Accordingly, a hydraulically controlled source such as described hereinafter in FIG. 18 and as described in the above-refenced John V. Bouyoucos Patent application, Ser. No. 730,752, may typically be used.

For the generation of seismic signals, the use of shaped pulses is preferred. It is desirable that the pulses be shaped so as to provide a spectral bandwidth corresponding to the desired transmission bandwidth, such as used for geophysical analysis in the case of seismic signals. For other echo ranging and location systems, the transmission bandwidth is desirably constrained to fall within the bandwidth of the receiving system. This is because energy contained in the pulse spectrum that falls outside of the analysis band is lost, making the process inefficient.

In order to constrain the transmitted spectrum, it is desirable to shape the pulse through the use of springs or by other pulse shaping networks which control the forces generated by the pulse generating event. The design of impact springs is disclosed in the above-referenced related application filed in the name of John V. Bouyoucos. Reference may also be had to U.S. Pat. Nos. 3,382,932 and 3,570,609, which are also referenced in the related application, for further information with respect to the design of suitable pulse shaping springs. Through the use of such springs, a force pulse with a shape similar to a half-sinusoid as shown in FIG. 1 is obtained. Each pulse is of like duration, indicated in FIG. 1 as being $T_P$. The fundamental period of the pulses is indicated as $T_R$. For a half-sinusoid force pulse, the frequency, $f_o$, for which the spectral energy level $E(f)$ is reduced approximately 3 dB (i.e., by one-half) of the level at low frequencies (at the low frequency asymptote) is approximately, $f_o=0.6$ $(1/T_p)$. This frequency $f_o$ can be equated to the upper frequency limit of the analysis band. The force pulse is thus tailored to place the majority of the energy of the event below the upper frequency of the analysis band. The energy in each pulse event is proportional to the square of the amplitude (viz., the square of the peak force of the pulse) and the duration of the force. Since the duration is controlled by the shaping action of the spring and is the same for each pulse, the energy is proportional to the square of the amplitude. When the force pulses are repeated, the spectrum of the repetitive train is constrained to the spectrum of each individual pulse. The absolute spectrum level is, however, a function of the repetitive frequency.

Figure 2:
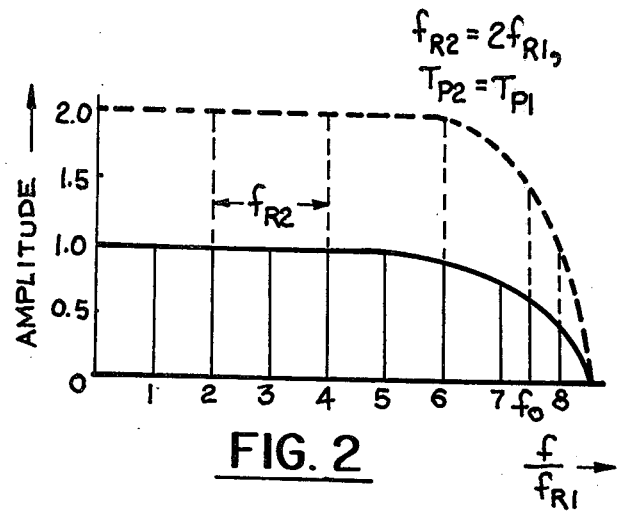
FIG. 2 is a diagram illustrating the spectrum of a train of repetitive pulses such as those shown in FIG. 1 and of another train of similar pulses which are repetitive at twice the repetition frequency of the first train.

FIG. 2 shows the spectrum resulting from pulses which have constant repetition frequency $f_R$. The period or time interval $T_R$ between force pulses (see FIG. 1) is then equal for the entire force pulse train. Instead of a continuous spectrum extending to the cut-off frequency $f_o$, the spectrum is broken up into a series of line components, called spectral lines, spaced apart a distance $f_R$ (vis., at the harmonics of the repetition frequency) and confined to the envelope of the spectrum of an individual pulse. The amplitude of the spectral components is proportional to the repetition frequency. The solid line envelope in FIG. 2 illustrates the case where the fundamental repetition frequency $f_{R1}$ is half the repetition frequency $f_{R2}$ shown by the dash line envelope. Since there are half as many lines within the envelope where the repetition frequency is $f_{R2}$ and since there are twice as many impulses per unit time, the individual line amplitudes for the $f_{R2}$ train are twice as high as those for the $f_{R1}$ train. The spectral energy level $E(f)$ is proportional to the square of these amplitudes. Accordingly, the spectral level for the $f_{R2}$ train is 6 dB or four times that of the spectral level for the $f_{R1}$ train.

Since the source characteristics and the coupling between the source and the transmission medium are generally the same for each pulse in the train, the amplitudes of the harmonic components which are transmitted into the medium and their corresponding spectral lines will be the same for each pulse. In many systems, such as marine systems, the source and source-to-medium coupling charactreristics do not significantly vary. Accordingly, the spectral components and the harmonics have the same and equal amplitude across the spectrum. Through the use of deconvolution filters and other deconvolution techniques at the receiver end of the system, variations in level across the spectrum may be compensated for. Accordingly, the description of the invention as set forth herein describes the harmonics and spectral components as being of the same amplitude over the entire spectrum (i.e., over the entire frequency range).

Inasmuch as the duration $T_P$ of each individual pulse is short as compared with the periods of the lower harmonic frequencies of interest, the phases of all of these harmonics are substantially zero with respect to the approximate impact time of the pulses. In other words, the phase center of all of the harmonics and the impact time center of the pulses can be considered as the same. There may be some deviation in higher order harmonics, which require accounting when constructing the pulse trains to be used. For purposes of explanation of the invention, all harmonics of signals having the same repetition frequency and produced by the same source can be considered to have the same phase center.

Consider, however, that for pulses at higher repetition frequencies which are time locked at some time displacement with respect to the pulses at a lower repetition frequency, the phases of the harmonics of the higher repetition frequency train will be displaced from the phases of the corresponding harmonics of the lower repetition freuency train by a factor equal to the ratio of the repetition frequencies of the trains. Thus, for example, if the repetition frequency of the higher repetition frequency train were twice that of the lower repetition frequency train ($f_{R2}=2f_{R1}$), then the phase of the second harmonic of the $f_{R1}$ train would be displaced from the fundamental of the $f_{R2}$ train by twice the phase displacement between the fundamental component of the first train and a non-existent component of half the fundamental frequency of the second train. For example, a displacement between the fundamental component of 80° would result in phase displacement between the second harmonic component of the $f_{R1}$ train and the fundamental component of the $f_{R2}$ train of 160°. The foregoing follows from Fourier analysis of pulse trains which are repetitive and should be kept in mind as the description of the invention proceeds.

The frequency spectrum of interest extends over more than one octave in many echolocation and echo ranging systems. In seismic exploration systems, the frequency range of interest may be about 100 Hz or more. For a frequency at the low end of the range of about 20 Hz, this corresponds to two or more octaves. It has been the practice in seismic exploration systems such as the "Vibroseis" system to generate sinusoidal signals which are as purely of a sinusoidal waveform as possible so as not to contain any harmonics, and to sweep such signals over the entire frequency range of interest. This, of course, is for larger than an octave (2:1) freuqency range. The generation of such pure sinusoidal waves, particularly at large amplitudes, is very difficult. Moreover, variations in coupling between the source and the medium make the generation of harmonics unavoidable. These harmonics correlate with the sinusoidal signal and produce false targets which make the resolution of the geological reflection surfaces difficult to achieve.

The present invention makes it possible to employ sources which are rich in harmonics such as the quasi-repetitive pulse sources which were described above and which will be discussed in greater detail hereinafter. By eliminating the false targets and side lobe noise created by the harmonic interferences, the invention makes it possible to use several sources which generate and transmit many impulses during a transmission interval, thereby enabling signals of high energy to be transmitted. The invention provides formats or sequences of such pulses which construct spectra having the desirable autocorrelation functions of a narrow main lobe and the absence of significant side lobes. The invention also utilizes sources of pulses, the repetition frequencies of which are restricted to an octave sweep, thereby simplifying the design of the sources.

The transmission of a single sequence of pulses, or other signals rich in harmonics, whose repetition frequency is swept over an octave band does not provide a constant falt spectrum level without undulations across the desired multi-octave frequency range. In other words, it is not possible merely to sweep the repetition frequency from repetition frequency 1 to repetition frequency 2 as shown in FIG. 2 and provide by reason of the harmonics of these impulses a flat spectrum level across the frequency range of interest (viz., to $f_o$).

The result of a sweep in repetition frequency from 20 to 40 Hz (viz., the one octave at the lower end of the frequency range) on the spectrum level E(f) is shown in FIG. 3. It will be recalled from the discussion of FIG. 2 that, as the fundamental sweeps from 20 to 40 Hz, the second harmonic sweeps from 40 to 80 Hz at twice the rate. In any given frequency bin or panel within the sweep range, the second harmonic contributes only half the energy that the fundamental contributes in moving at half of the rate of the second harmonic. Therefore, the spectral level of the second harmonic panel is one half (or 3 dB less than) the fundamental bin level. Similarly, the third harmonic sweeps from 60 to 120 Hz at three times the rate of the fundamental sweep. Accordingly, the spectral level of the third harmonic panel is one third (or 5 dB less than) the fundamental panel level. The spectral level $E_n$ of the nth harmonic panel is then 1/n of the fundamental panel level. When the contributions of the various panels or bins are summed, the result, as shown in FIG. 4, is obtained. There is a 3-dB step between the first and the beginning of the second harmonic contribution. Then, when the third harmonic and second harmonic coincide, the spectral level tends to oscillate or undulate. The dash lines shown the mean spectral level upon which these undulations are superimposed. These spectral joints or discontinuities cause a deterioration of the autocorrelation function which is manifested as a ringing close to the origin (close to the main lobe), and the undulations or grass, although reduced in effect by smoothing of the mean spectral level, nevertheless contribute to side lobes and false target indications in the cross correlation processing of the signals upon reception.

An autocorrelation function which results from a spectrum such as the one shown in FIG. 4 is illustrated in simplified form in FIG. 5. The width of the main lobe $T_{ML}$ is inversely proportional to the frequency range or bandwidth of the signal. A large bandwidth such as 100 Hz results in a narrow main lobe. However, the joint discontinuity causes a ringing, and the undulations produce side lobes.

FIG. 6 illustrates the cause of the undulations in the spectral level and of the side lobes in the autocorrelation function. As shown in FIG. 6, there are octave harmonics (viz., harmonics which sweep over frequency bands which are octaves of the fundamental and of each oter). These are octaves at frequencies twice, four times, eight times, sixteen times..the fundamental repetition frequency. Of the four bands shown in FIG. 6, the fundamental, second, and fourth harmonics H1, H2, and H4 are the octave harmonics. The other harmonics are non-octave harmonics. These are at frequencies three times, five times, six times, seven times, nine times..the fundamental. At a time after the beginning of the sweep indicated in FIG. 6 as $t_{3\text{-}4}$, the third harmonic H3 will reach a frequency of 80 Hz which is the same frequency at the beginning of the sweep of the fourth harmonic H4. At anothe time $t_{2\text{-}3}$, the second harmonic will reach a frequency of 60 Hz which the third harmonic reached at the beginning of the sweep. These frequencies correlate with each other at times $t_{3\text{-}4}$ and $t_{2\text{-}3}$ and produce side lobes in the autocorrelation function at these times. In the spectrum, the harmonics interfere with each other and produce the undulations which are shown in FIG. 4.

It has been discovered in accordance with the invention that the false target indication, the undulating spectrum, and the side lobes in the autocorrelation function of the transmission come about because a given frequency appears in the transmission at more than one time. By reducing the amplitudes of any frequency component of the power spectrum which appears more than once, the undulations may be reduced and can be substantially eliminated, thus providing an autocorrelation function in which significant side lobe energy is not present. This is accomplished in accordance with the invention by reducing the amplitude of the non-octave harmonics by tuning (phasing) and, in some cases, varying the amplitude of the pulses produced by a plurality of souces of the pulses. In addition, the phasing is used not only to reduce the amplitude of the harmonics which interfere with each other to produce undulations, but also to adjust or augment the octave harmonics so that the spectrum level resulting therefrom increases from the one half, one quarter . . . of the amplitude of the fundamental octave (see FIG. 3), and the spectrum level is made flat and constant across the frequency range.

FIG. 7 and 8 illustrate the methods and means provided by the invention whereby a flat spectrum over the fequency range of interest of approximately three octaves may be obtained, using a plurality of souces, particularly seven sources $S_1$ through $S_7$. The first source which operates by sweeping the fundamental octave of normalized frequency $f_o$ from 1 to 2 produces spectral lines having amplitudes as shown in FIG. 7A. Only the lines which are produced by the succession of pulses at the beginning of each sweep are shown to simplify the illustration.

The duration of each repeated succession of pulses changs (in this case is reduced, since an upsweep is considered in this example).

The repetition frequency of the pulses from the souces is preferably swept so that their period changes linearly over the octave; i.e., linear period modulation (LPM) of the repetition frequency is used. LPM provides for constant spectrum level over the octave sweep. LPM is governed by an equation of the form $$f_r(t)=f_o/(1-(t/2T)), \; 0 \leq t \leq T$$

where $f_r$ is the repetition frequency, $f_o$ is the frequency at the beginning of the sweep, and T is the duration of the transmission. LPM and other formats for changing and repetition frequency are described in the above reference Bouyoucos application Ser. No. 730,752.

It will be appreciated that the fundamental sweep sweeps, in normalized frequency terms from 1 to 2 during a transmission interval, and this sweep is produced by the first or fundamental source $S_1$. The second source $S_2$ sweeps over the second harmonic from 2 to 4, the third source $S_3$ sweeps the third harmonic from 3 to 6, the fourth source $S_4$ sweeps the fourth harmonic from 4 to 8, and so forth. Each succession of pulses has the duration equal to the period of the pulses from the fundamental source $S_1$ and the pulses from the other harmonic sources divide the duration of each repeated succession in the same proportion during the transmission interval over which the sequence made up of all of the pulses is produced. The transmission interval may suitably be from 4 to 15 seconds.

The amplitudes of the spectral lines produced by the first source are all equal for purposes of explanation of the invention, as was explained above in connection with FIG. 2. In order to provide a flat spectrum in which undulations are absent, the non-octave harmonics which start at normalized frequencies 3, 5, 6, and 7, are eliminated. The octave harmonics are augmented in order to flatten the spectrum. It will be recalled that the spectrum level of the second harmonic panel is one-half that of the first panel. Accordingly, the amplitude of the spectral lines due to the second harmonic source should by the $\sqrt{2}$ times the amplitude of the first harmonic component in order to elimate the discontinuity between the first and second panels and equalize the spectrum (compare FIG. 3). The third harmonic panel is to be eliminated as are the other non-octave panels in order to eliminate undulations in the spectrum. The fourth harmonic panel is only at one-quarter the spectral level of the first panel. Accordingly, the amplitude of the spectral lines which cover the fourth harmonic panel must be twice that of the first harmonic panel. In general, the octave harmonics should be adjusted to have an amplitude equal to the $\sqrt{n}$ (times the amplitude of the fundamental or first harmonic spectral component, where n is the harmonic number).

The desired relationship of spectral components which will produce a flat spectrum absent of harmonics is illustrated in FIG. 7B. To obtain the spectral line amplitude shown in FIG. 7B, the spectral lines shown in FIG. 7A are combined with spectral lines having the amplitudes shown in FIG. 7C. The second harmonic spectral line due to the sum of the lines from the source are then augmented and equal 1.414 or $\sqrt{2}$. The spectral lines for the third harmonic source $S_3$ are of opposite polarity (180° out of phase) with the third harmonic spectral line produced by the fundamental source $S_1$ and have the same amplitude (i.e., 1.0). This results in the elimination of the third harmonic panel. The fourth harmonic spectral component receives a contribution to its amplitude from the second harmonic source $S_2$ as well as from the first or fundamental source $S_1$. In order to provide the spectral level of 2.0, the fourth harmonic source $S_4$ need only have an amplitude of 0.586. The amplitudes of sources S5 and S7 which eliminate the fifth and seventh panels are 1.0, since the elimination of the entire fifth and seventh harmonic spectral components is needed. There are contributions from the lower order sources to the sixth harmonic. Accordingly, these contributions are taken into account in providing the spectral line amplitudes at the sixth harmonic. Table 1, which is set forth below, gives the amplitudes of the higher harmonic source such that the spectral components illustrated in FIG. 7C are obtained. All of these sources are phase locked to the fundamental source so that the harmonic components are all coherent with each other so that they sum coherently. Undulations are therefore removed from the spectrum of the signals. It will be noted that the spectrum levels for the sources illustrated in FIG. 7C differ from the amplitudes set forth in Table 1 by a factor which is equal to the harmonic number of the source. This is because the number of pulses in each fundamental period is equal to the harmonic number such that the amplitude of each pulse need only be the desired spectral amplitude divided by the harmonic number. Consider, for example, how the amplitude of the pulses from the second harmonic source $S_2$ and the fourth harmonic source $S_4$ as shown in Table 1 is obtained. The amplitude of the spectral components from the fundamental source is 1. The second harmonic source has twice as many pulses in each fundamental period as the fundamental source. By using an amplitude of 0.207107, the spectral components will have twice the amplitude or 0.41414, which is the requisite additional second harmonic amplitude. The spectral component at the fourth harmonic resulting from the contributions of the first and second harmonics is 1.414. The required spectral amplitude is 2.0. Thus only a spectral amplitude of 0.585785 is required to reach the spectral amplitude of 2. The $S_4$ source operating at the fourth harmonic will produce four pulses in the fundamental period. Each pulse from the fourth harmonic source therefore need only have an amplitude necessary to make up one quarter of the 0.585785 amplitude which is required. The fourth harmonic source therefore need only have an amplitude of 0.146447, which is the amplitude shown in Table 1.

TABLE 1

| Source Harmonic | Amplitude | Spectral Line Level | Phase |
|---|---|---|---|
| Fundamental, $S_1$ | 1 | 1 | 0° |
| 2nd, $S_2$ | .207107 | .414 | 0° |
| 3rd, $S_3$ | .333333 | 1 | 180° |
| 4th, $S_4$ | .146447 | .586 | 0° |
| 5th, $S_5$ | .2 | 1 | 180° |
| 6th, $S_6$ | .402369 | 2.414 | 180° |
| 7th, $S_7$ | .142857 | 1 | 180° |
| 8th, $S_8$ | .103553 | .8284 | 0° |

When the spectral components from all of the seven sources are combined, the spectral level E(f) results from the summation of the octave harmonic sources $S_1$, $S_2$ and $S_4$. Their summation is coherenet because all of these sources are phase locked. Accordingly, the envelope is flat and conforms to the envelope of a single impulse such as is shown in FIG. 2.

In lieu of separate sources in addition to the fundamental source, the fundamental source may be made to operate at the harmonic frequency but with impulses of different amplitude. For example, this composite source operating at the second harmonic frequency would have successive pulses in amplitudes 1.207107 and 0.207107.

Although the use of a multiplicity of locked sources provides a flat spectrum without undulations over a theoretically unlimited frequency range, it is desirable to operate with sources which vary in repetition frequency over the same octave. Two such sources may be used, for example, to provide repetition frequency which sweeps over a second harmonic octave when displaced in time by one-half of the fundamental period, which, for the purpose of explanation, is referred to as a 180° phase displacement. Alternatively, a second harmonic source may be provided by the same source which operates at twice the repetition frequency.

Use of higher harmonic octave frequencies may result in inefficiency if their frequencies extend beyond the spectral range of interest. The augmentation of harmonic octaves and the reduction in amplitude of non-harmonic octaves may also be obtained through the use of sources operative to sweep over the fundamental octave range or the second harmonic octave range and combined with proper timing (i.e., in proper phase relationship). The principles upon which methods and apparatus for using such fundamental and/or second harmonic sources will be more apparent from FIGS. 9 through 16.

Consider first the reduction in the amplitude of the third harmonic panel and the spectral lines therein by the use of two sources $S_1$ and $S_2$ which operate so as to sweep over the same octave. The pulses generated by the sources are of equal amplitude. How the amplitude of the third harmonic spectral line components, resulting from the first source $S_1$ and a second source $S_2$, varies as a function of phase displacement, $\phi_{S1-S2}$, is shown in FIG. 9. The ratio of the amplitudes of the third harmonics of sources $S_1$ and $S_2$ varies over a normalized range from 0 to 2. When the impulses from the second source $S_2$ are displaced 60° with respect to the impulses from the $S_1$ source, the third harmonics cancel and are eliminated. The third harmonics are also eliminated where the phase relationship of the pulses is 180°, but this phase relationship will result in the cancellation of the fundamental component as well and is not useful. However, the use of two sources can provide for the cancellation of any harmonic component and any frequency panel when the sources are properly phased. By phasing the pulses from two sources $S_1$ and $S_2$ at 60°, the third harmonic components which give rise to the highest amplitude side lobes may be eliminated. this removes from the autocorrelation function the critical side lobes and extends the undulation-free bandwidth of the spectrum where it may be useful without further amplitude adjustment in many seismic exploration systems.

It is, however, desirable to adjust the level of the second and fourth harmonic components so that the spectrum level is essentially flat. Such adjustment may be accomplished with a single additional source of proper amplitudes as is illustrated in FIG. 10. FIG. 10 has been drawn for purposes of illustration for the case where a second source for the reduction in the amplitude of the third harmonic is not used. Two sources are shown. A first vector $S_1$ represents the fundamental source of amplitude 1 at zero phase. Another source $S_2$ is used which operates at the second harmonic and sweeps over the second harmonic octave. The spectral line level of the pulses from $S_2$ in normalized terms is 1.86. The phase displacement of the first pulse in the second source, indicated in the drawing as $S_2$, with respect to the pulses from the first source is 65.8°. Translated to the second harmonic phase, as was explained above in connection with FIG. 2, the second harmonic vector is at twice the pulse spacing or 131.6°. The sum vector $(S_{1H2}+S_{2H1})$ for the second harmonic component $S_{2H1}$ from the first source $S_1$ and the first harmonic component $S_{2H1}$ from the second source $S_2$ lies on a circle having a radius equal to the $\sqrt{2}$. This is the desired amplitude for the second harmonic spectral component.

The fourth harmonic spectral component also is provided at the desired amplitude of 2. The second harmonic of the second source $S_{2H2}$ will have the same amplitude as the first harmonic component, 1.86, but will be at twice the phase displacement or 263.2°. The sum vector $(S_{1H4}+S_{2H2})$ has a length of 2 and lies on a circle of radius 2. Accordingly, both the second and fourth harmonics spectral components may be equalized through the use of a single source in addition to the fundamental source, which is phased at a predetermined phase displacement with respect to the fundamental source.

The foregoing discussions have illustrated first how the third harmonic spectral component can be eliminated with the use of two sources, and second how the second and fourth harmonics can be adjusted in amplitude using a further second harmonic source. by the use of these three sources, two operating to sweep over the fundamental octave, and the third operating to sweep over the second harmonic octave, or four sources all of which sweep over the fundamental octave, which sources are time controlled to have predetermined phase relationships (viz., in accordance with a code provided by this invention), the spectral level may be made flat over two and one-half octaves and undulations therein eliminated. In the code utilizing the combination of three or four sources, the second source $S_2$ is provided to sweep over the fundamental octave but is phased with respect to the fundamental source $S_1$ at 60° so as to reduce the amplitude of the third harmonic panel. The remaining source or sources may in one case have an amplitude different from the amplitude of the pulses from the first two sources $S_1$ and $S_2$, and in the second case all the pulses from all the sources may have the same amplitude.

Consider first the case where the third source or the third and fourth sources operate to sweep across the second harmonic octave and may have an amplitude different from the amplitude of the first two sources. FIG. 11 is a plot showing the error between the desired amplitude of the fourth harmonic $A_{H4}$, which of course is 2, as the phase displacement, in terms of the pulse spacing between the first pulse of the pair of pulses which provides the second harmonic source and the pulse from the fundamental source varies. One half of the phase displacement between the second harmonic spectral component from the fundamental source and the fundamental spectral component from the second harmonic source is equal to this pulse spaceing. The amplitude of the third or third and fourth sources is adjusted so that the amplitude of the second harmonic component of the sum of all of the sources has the relative value of $\sqrt{2}$. At a phase displacement of approximately 85.5° the error is substantially nil.

Consider FIG. 12 which is a similar curve for the case where the amplitude of the second harmonic source or sources which provide the second harmonic is equal to the amplitude of the pulses from the fundamental source. There is no value of phase displacement where the error in the desired second harmonic amplitude, $A_{H2} = \sqrt{2}$ and the fourth harmonic amplitude, $A_{H4} = 2$ are both reduced to zero. The closest compromise exists at 80.5° where the error is approximately 1.4 dB. At 70° the second harmonic amplitude $A_{H2}$ is approximately the $\sqrt{2}$ and the error is negligible. However, the fourth harmonic error is almost 2 dB. In the interest of simplicity of source design, the use of sources which sweep over the same repetition frequency range and have the same amplitude may be preferable. However, the resulting spectrum is not completely flat. A spectrum which will be flat results if the amplitude of the pulses which provide the second harmonic source (viz., $A_{S3}$ and $A_{S4}$) is approximately 1.31 times the amplitude of the pulses from the fundamental source, $A_{S1}$.

FIG. 13 illustrates the pulse spacing of pulses which are generated and transmitted in accordance with the aforementioned code for the combination of four sources. A succession of pulses which is generated during the fundamental pulse period is shown. It will be appreciated that the duration of this period, and of the succession, changes upon each repetition as the repetition frequency of the pulses is swept during the transmission interval, and varies over the octave range of two to one during the transmission interval. The fundamental first source is shown as $S_1$. The second source at $S_2$ is phase displaced 60° with respect to $S_1$ and serves to eliminate the third harmonic panel. The third and fourth sources $S_3$ and $S_4$ are 180° phase displaced with respect to each other and may be replaced by a single source operating at the second harmonic and covering the second harmonic of the fundamental octave. FIG. 13 also illustrates alternative sources $S_3'$ and $S_4'$ which have amplitudes not equal to the amplitude of $S_1$ but 1.31 times as great. This will provide a fully flat spectrum.

The vector diagrams shown in FIG. 15 illustrate the combination of the fundamental, second and third harmonics spectral components for the sources having the phase displacement shown in FIG. 13. The case illustrated in FIG. 15 is for the sources $S_3'$ and $S_4'$ where the first pulse $S_3$ is at 85.5° phase displacement with respect to the fundamental source pulses $S_1$. For the fundamental source $S_1$ the spectral components of all harmonics are of equal amplitude and fixed in phase. The second source $S_2$ is phase displaced at 60° with respect to the fundamental source $S_1$. The second harmonic phase displacement is two times the fundamental phase displacement or 120°. The third harmonic phase displacement is 180°. Accordingly, the third harmonic spectral components cancel. The fourth harmonic spectral component due to the second source $S_2$ is at four times the phase displacement of these sources $S_1 S_2$ at the fundamental frequency, or 240°. The fundamental, second and fourth harmonics spectral components of the first two sources $S_1$ and $S_2$ combine as shown in the thrid set of vectors. The sum vector $S_1 + S_2$ has an amplitude of 3 and a phase of 30° all with respect to the phase of the fundamental. The second harmonic remains at unit amplitude for the sum vector and is at an angle of 60°. The fourth harmonic also remains at unit amplitude but is rotated 300°. The second harmonic vector resulting from the source pair $S_3'$ and $S_4'$ is the sum of their individual amplitudes or 2.62. The angle at which this sum vector appears at the second harmonic is twice the pulse spacing of $S_4'$ with respect to $S_1$ or 171°. The fourth harmonic of this sum vector $S_3' + S_4'$ is twice this angle or 342°. When all of the vectors are summed the fundamental vector remains at the amplitude of the $\sqrt{3}$. The sum vector of $S_1 + S_2 + S_3' + S_4'$ at the second harmonic is 2.45. At the fourth harmonic the sum vector is of an amplitude 3.432. The fundamental, second, third and fourth harmanics have a ratio $1:\sqrt{2}:0:2$.

When all of the sources $S_1$, $S_2$, $S_3$ and $S_4$ produce pulses of equal amplitude and the phase displacement of the pulses from sources $S_3$ and $S_4$ is at 80.5° or 260.5° as may be selected through the use of the curve shown in FIG. 12. The final vector representing the sum of the fundamental through fourth harmonics of these sources will not be exactly in the ratio $1:\sqrt{2}:0:2$. However, the spectrum will be substantially flat and provide significant improvements when the signals are used for geophysical exploration purposes.

Since the signal spectrum will be substantially flat, and it will have an autocorrelation function in which side lobes are much lower in amplitude than the main lobe over a spectral range of 5:1 (e.g., 20-100Hz).

Similarly, code sequences can be provided utilizing sources which produce pulses of equal amplitudes which cover a wider spectral range. Inasmuch as each source is capable of providing pules up to a maximum amplitude, the use of additional sources enables the spectral energy of the transmitted signal to be increased.

In order to obtain the spectral range of 6:1, eight sources $S_1$ to $S_8$ may be used to produce successions of pulses having a phase spacing during each succession, in accordance with the code illustrated in FIG. 14. The duration of each succession in the fundamental period in this code, the relative spacing of the sources $S_2$ to $S_8$ with respect to the fundamental source $S_1$ is as follows: $S_2$, 30°; $S_3$, 300°; $S_4$, 330°; $S_5$, 30°; $S_6$, 30°; $S_7$, 210°; and $S_8$, 210°. The pulses from sources $S_5$ through $S_8$ can be replaced with a single source which produces sources of twice the amplitude and twice the frequency of the pulses produced by the other sources $S_1$ to $S_4$, thereby reducing the sources to five in number.

The vector diagrams of FIG. 16 illustrate how the sources $S_1$ to $S_8$ combine to produce harmonic components over five harmonics (a 2.5 octave frequency range). For the sake of simplicity the fifth through eighth sources are illustrated as a source having twice the amplitude of the $S_1$ through $S_4$ sources. The final set of vector diagrams for the five harmonics shows that the fundamental, second, third, fourth and fifth harmonic are in the ratio 1:1.303:0:1.494 and 0.268. The spectrum level while not entirely flat and free of ringing is substantially improved and within the tolerances of geophysical exploration systems which use cross-correlation processing.

An exemplary system which utilizes four sources, the pulses from which may be displaced in accordance with the code described above in connection with FIGS. 35 and 15 is shown in FIG. 17. The sources $S_1$ through $S_4$ may be mounted in an array. The sources may, in marine application, be mounted together on a tow body. The body is towed by a survey ship along a course. Mounted with the sources on the towed body or nearby the sources are transducers $T_1$, $T_2$, $T_3$ and $T_4$. These transducers serve as control transducers in that they pick up the impulses generated by the sources and produce electrical signals used to correct and otherwise control the sequence and amplitude of the pulses. In land applications, the sources may be deployed in an array along the line perpendicular to the travel of the survey vehicles. The sources may be mounted individually on separate survey vehicles or in a structure carried by a single vehicle. The sources themselves may be impact sources as discussed above. A suitable source is described hereinafter in greater detail in connection with FIG. 18.

Source controllers 300 provide operating signals for each of the sources. These sources controllers may be control signal generators, one for each of the sources, which are responsive to signals corresponding to the timing and amplitude of the pulses to be generated. In the event that the sources are hydraulically actuated impact devices, these control signals are adapted to operate the control valves of the devices so as to cause them to generate impact events in sequences specified by the code and with the amplitudes which are also specified by the code. In the event that the sources are designed to produce pulses of the same amplitude, amplitude control may be omitted.

A code generator 302 produces the code sequences and distributes them to the source controllers for the respective sources. The code generator may be implemented from microprocessor integrated circuit components of the type which are presently commercially available and the use of such microprocessor components is presently preferred. However, the code generator may be implemented through the use of recording techniques whereby the code sequences together with signals representing the amplitude of the pulses making up the sequences are recorded on magnetic record media such as disc, tape or drum storage units. The units may be operated in synchronism so as to reproduce signals having the timing specified by the code, and other signals having the amplitudes specified by the code. Alternatively the sequences of signals in accordance with the code may be recorded sequentially and distributed to the source controller for the individual sources by demultiplexers or other distributor circuits.

the code may be corrected in response to perturbations in the transmitting medium or in the sources themselves. For example, in marine applications, changes in depth of the towed body may arise which might cause a change in the amplitude and timing of the pulses. An error corrector 304 responds to the signals which are transmitted by the sources and detected by the transducers $T_1$ to $T_4$ and corrects the code to compensate for these errors. An exemplary code generator and error corrector system will be described hereinafter in connection with FIG. 21.

A suitable impact device which may be used to provide the sources as well as valving and controllers therefor are described in detail in the above mentioned related application, Ser. No. 730,352, filed in the name of John V. Bouyoucos, to which reference may be had. Such an impact device, which is of the type shown in FIGS. 30 and 31 of the Buoyoucos application, is illustrated in FIG. 18.

FIG. 18 shows a force pulse generator 16, suitable for use as one of the sources, and its control signal generator 112 which may be one of four such contained in the source controllers 300 (FIG. 17). A cylindrical housing 56 has a step bore 58 in which a hammer 60 can oscillate in a direction axially of the housing 56. The hammer 60 has a mass $M_H$ which is driven to produce an impact even during each cycle of its oscillation. From this impact event the force pulse is generated.

The hammer 60 has a piston portion 62. It also has end sections 64 and 66 which slide in bearing sections 68 and 70. These bearing sections 68 and 70 are on opposite sides of a cavity 72 formed by the step bore 58. This cavity is divided by the piston 62 into two parts 74 and 76 on opposite sides of the piston 62.

Pressurized hydraulic fluid is fed into the cavities 74 and 76 via control valves connected thereto via ports 78 and 80. The pressure in the cavities 74 and 76 is switched between supply and return by means of the control valves 50 to effectuate the cyclical movement or oscillation of the hammer 60. The time history of the motion of the hammer 60 in relation to the electrical signals which control this hammer motion and the resultant force pulses are illustrated in FIG. 19. The repetition frequency and the amplitude of the hammer motion may be controlled for the purpose of providing the code sequences of force pulses having predetermined amplitudes in the sequence in accordance with this invention. It will be noted that the hammer 60 displacement $X_H$ as shown in FIG. 19 undergoes an abrupt change of velocity corresponding to the impact events. It is at the times when this abrupt change of velocity occurs that the force pulses are initiated.

These force pulses are generated when the lower end of the hammer 60 impacts upon an impact spring 600. This spring is provided by a receiver piston 612. The hammer which impacts a receiver piston 612 which is movable into a volume 614 of hydraulic fluid, suitably hydraulic oil. The volume 614 and the piston 612 are integral with a radiator 616 which interfaces with the water into which the signals are to be projected. The base of the radiator 616 may be a cylindrical surface that slides along a bore 620 of the housing 56 for the source 16. Suitable seals, shown by way of example as an "O" ring 624, isolate the interior of the source 16 from the surrounding water environment. The internal pressure within the housing 56 may be ambient pressure (atmospheric pressure at the surface). The pressurization may be maintained by way of a line 626 so as to enable the internal pressure to be set at the surface. This internal pressure is of course much less than the pressure of the underwater environment.

Upon impact of the hammer 60 upon the receiver piston 612, the radiator 616 is driven outwardly by the elevated pressure in the volume 614 of the impact spring 600 due to the entry of the piston 612 into the liquid volume 614. As the radiator accelerates outwardly into the water, a positive pressure pulse is generated. The magnitude of the pulse along the axis of the radiator 616 is given approximately by the expression $$P(\gamma) = (\rho a^2 / 4 \gamma) A \tag{1}$$

where a is the radius of the radiator 616, A is the acceleration of the radiator, and $\gamma$ is the distance along the axis of the radiator to the observation point. $\rho$ is the density of the water surrounding the generator 600. The time duration $T_P$ of the pressure pulse is controlled by the duration of the outward acceleration of the radiator 616, which in turn is controlled by the mass of the piston $M_H$, the mass of the radiator 616 including the receiver piston 612, the liquid volume 614 and the other parts which are movable with the radiator 616. this mass is $M_R$. Also determining the pulse duration is the inertia of the water load $M_I$ and the stiffness of the liquid spring $K_I$. The pressure differential due to the sea water head re-seats the radiator 616 against the housing 56 after each pulse. The radiator is formed with a flange which may engage a ring of cushioning material 630 attached to the forward end of the housing. This ring 630 serves to cushion the impact of the reseating event.

The control valves 50 are fed by supply and return lines 104 and 106 from a hydraulic power supply. Supply and return accumulators (now shown) may be closely coupled to the supply and return lines 104 and 106 respectively. The control valves 50 receive an electrical input signal indicated as $e_V$ from the control signal generator 112. The signal $e_V$ controls the valving action which in turn controls the cycle of oscillation of the hammer 60 so as to enable the repetition frequency and amplitude (energy) of the impact event and the resulting force pulses to be predetermined. The repetition frequency and energy is dictated by external input signals $e_R$ and $e_B$ which are applied to the generator 112. The signal $e_R$ is a pulse signal which times the occurrence of the impact events, and thus the repetition frequency of the force pulses. The signal $e_B$ is a level which sets the amplitude (energy) of the force pulses. Thus by varying or sweeping the repetition frequency of the $e_R$ pulses, the force pulse repetition frequency may be varied while simultaneously varying or maintaining constant the amplitude of the force pulses through the control of the $e_B$ level. The variations in the force pulse repetition frequency and amplitude are in accordance with the code provided by this invention.

The generator 112 may also include, as may be observed from FIG. 20, a parameter generator 166 which receives information respecting the various parameters affecting the oscillation cycle of the hammer 60 in the source 16. These parameters are the displacement of the hammer $X_H$ and the supply and return pressures $P_S$ and $P_R$. The pressures are obtained from pressure sensor transducers 114 and 116 attached to the supply and return lines 104 and 106. A displacement sensor 118 is mounted in the bore 58, above the upper end 64 of the hammer 60. This displacement sensor 118 is suitably a differential transformer consisting of a coil and a magnet. The magnet may be attached to the upper end 64 of the piston 60, such that the signal from the sensor 118 which is inputted to the parameter generator of the control signal generator 112 is proportional to the displacement of the hammer 60.

The time history of motion of the hammer 60 is illustrated in FIG. 19. FIG. 19(a) shows the time history of the hydraulic force $F_D$ applied to the piston 62; FIG. 19(b) shows the resulting hammer motion and FIG. 19(c) shows the relative timing of the impact events. With reference first to FIG. 19(c), which shows one cycle of piston hammer displacement, the zero ordinate corresponds to the hammer 60 in initial contact with the receiver piston 82. Displacement in the negative-X direction corresponds to the hammer 60 in initial contact with the receiver piston 82. Displacement in the negative-X direction corresponds to driving the receiver piston 612 into the liquid volume 614, as shown in FIG. 18, and to displacement of the radiator 616 away from the housing 56. The force $F_p$ on the hammer 60 is illustrated in FIG. 19(c). Displacement of the hammer 60 in FIG. 19(b), in the plus-X direction corresponds to motion of the hammer 60 away from the impact position.

Impact of the hammer 60 on the receiver piston 612 occurs at time $T_O$. Following initial contact, the hammer 60 displaces negatively, following the receiver piston 612, only to rebound as the potential energy stored in the impact spring is partially returned to the hammer 60. Thus in rebound the hammer 60 returns toward the zero ordinate line. At a time, $T_{SO}$, after the hammer reached zero velocity and has transferred its kinetic energy to the impact spring-load system, the hydraulic force of the hammer (see FIG. 19(a)) switches direction, thereby accelerating the hammer away from the impact position. This switching time $T_{SO}$ is desirably near the natural zero axis crossing for piston displacement under rebound alone to avoid any reduction in the pulse energy transferred by the preceding event.

The combination of the rebound velocity and the upward force enables the hammer 60 to move away from impact at an ever increasing velocity. When the hammer 60 reaches a prescribed velocity (sensed by the displacement sensor 118) the hydraulic force $F_D$ on the hammer 60 is switched to the opposite direction (see FIG. 19(a)), thereby initiating a deceleration of the piston motion. This switching time is designated $T_{S1}$ in FIG. 19(b). The hammer 60 then decelerates and finally comes to zero velocity at $T_{S2}$ at a height shown as $X_S$ for an arbitrary time with zero force applied. At a subsequent switching time $T_{S3}$ a positive hydraulic force is again applied, and the hammer accelerates toward the load, impacting the receiver piston 82 at time $T_O'$. The holding times and switching times are predetermined in accordance with the control signals $e_R$ and $e_B$ by means of the systems to be described hereinafter in connection with FIGS. 24 and 24A.

The kinetic energy of the hammer 60 at impact is equal to the potential energy it held at position $X_S$. Thus, $$F_D X_S = \tfrac{1}{2} M_H V_I^2 \tag{2}$$

where $F_D$ is the hydraulic force on the hammer 60 in the downward direction (assumed constant over the hammer downstroke) and $V_I$ is the impact velocity.

A portion of the kinetic energy of the hammer 60 is transferred to the load while another portion appears as rebound velocity $V_R$, which is indicated as the slope of the hammer's time history curve (FIG. 19(b)), at time $T_{SO}$.

A previously noted, at or near time $T_{SO}$ the hydraulic force $F_D$ changes sign to drive the hammer 60 upward. The switching time $T_{S1}$ at which the force $F_D$ again changes sign, to enable the hammer to reach position $X_S$ and zero velocity simultaneously, can be shown to be $$T_{S1} = -(M_H/F_D) \atop V_R + \sqrt{(M_H X_S/F_D)[1+(M_H V_R^2/F_D X_S)]^{\frac{1}{2}}} \tag{3}$$

The time that the hammer 60 then takes to reach $X_S$ is $$T_{S2} - T_{S1} = T_{S1} = (M_H/F_D) V_R \tag{4}$$

The time delay between the switching time $T_{S3}$ and the subsequent impact event at time $T_O'$ becomes $$T_O' - T_{S3} = \sqrt{(2 M_H X_S/F_D)} \tag{5}$$

The total period, $T_R$, in the absence of any delay between $T_{S2}$ and $T_{S3}$, is $$T_R = T_O' - T_O = -(M_H/F_D) V_R + \\ 2\sqrt{(M_H X_S/F_D)} \{(1/\sqrt{2}) + [1+(M_H V_R^2/F_D X_S)]^{\frac{1}{2}}\} \tag{6}$$

If $V_R$ is zero, the maximum repetition frequency becomes $$f_R(MAX) = (1/T_R) = 0.292\sqrt{(F_D/M_H X_S)} \tag{7}$$

For a given blow energy, the repetition frequency can thus vary, as a function of the delay time $T_{S3} - T_{S2}$, from any value between zero and that given by Equation (7) (for $V_R = 0$).

The control signal generator 112 is illustrated in FIG. 20. The inputs to the system are input pulses $e_R$, which represent the desired sequence of hammer blows which result in the force pulses; and the signals $e_B$ which is an analog signal level. The control signal generator 112 is constituted of a parameter generator 166 and a timing generator 168. The parameter generator is responsive to the displacement signal $X_H$ from the displacement sensor 118 and provides output signal representing the velocity of the hammer $V_H$. The outputs of the pressure sensors 114 and 116 are utilized in the parameter generator 166 to provide an output corresponding to the force on the piston 62 which is proportional to the difference between the supply and the return pressure and is indicated as $K\Delta P$. As noted previously, $\Delta P$ is proportional to $F_D$, which is the force on the hammer 60 as applied to the piston 62 thereof.

The displacement signal $X_H$, the hammer velocity signal $V_H$, and the $K\Delta P$ signal, are all inputted to the timing generator 168. The timing generator provides signals at the instants $T_{S1}$, $T_{S2}$, $T_{S3}$, which are determinative of the repetition frequency $f_R$ and the force pulse amplitude (see FIG. 19). Also provided by the timing generator 168 are "dither" signals $T_{DT1}$ and $T_{DT2}$. These dither signals are utilized in order to displace the hammer incrementally to execute a stroke commensurate with the desired force pulse amplitude and energy. These signals at $T_{S1}$, $T_{S2}$, $T_{S3}$, $T_{DT1}$ and $T_{DT2}$ are digital signals which have but three levels, $+e_V$ a positive level, $-e_V$ a negative level, or a null or zero level. They are amplified in a valve driver amplifier 170 and applied to a servo valve 172. As dictated by the valve control signal $e_V$, the valve 172 has three states, namely a first state in which the valve ports supply an upward force to the hammer 60, a second state where the valve ports are closed and a third state where the valve ports are reversed from the first state to supply downward force to the hammer. The servo valve 172 may be an electrohydraulic valve; which is part of the valves 50 (FIG. 1). A commercially available valve such as of type No. 30 supplied by MOOG, INC., of East Aurora, N.Y., may be suitable.

The timing generator 168 is operative such that the signal corresponding to valve ports closed, i.e., $e_V = 0$, does not occur when the hammer has any appreciable velocity such that hydraulic fluid would be flowing through the valve 172. The condition that the valve not be put into the closed state when the hammer has appreciable velocity is predicated upon avoidance of the introduction of instantaneous high pressures which would occur when the valve closes which could cause failure in the valve components or elsewhere in the pulse generator.

The four timing instants $T_{SO}$, $T_{S1}$, $T_{S2}$, and $T_{S3}$ are shown in FIGS. 19(b) and have been discussed above in connection with these figures and Equations (1) through (5). How the timing generator 112 (viz., the parameter generator 166, and the timing generator 168) are implemented to derive these signals, is illustrated in FIG. 20.

It will be noted as the description proceeds that the components making up the control signal generator 112 are conventional digital or analog computer type components which may be procured in integrated circuit form or designed from discrete components in accordance with techniques known in the art.

The hammer displacement signal $X_H$ is applied to a differentiating circuit 174 in the parameter generator 166 to provide the hammer velocity signal $V_H$. The hammer cycle begins with hammer lift-off at time $T_{SO}$, which as shown in FIG. 19(b) is determined by a positive crossing of the zero displacement level by the hammer displacement signal $X_H$. This instant is determined by a comparator 176 which changes from a negative to positive state when the $X_H$ signal crosses the zero displacement level (viz., when lift-off occurs). This is identified as the positive transition of the output from the comparator 176, since one of the differential inputs thereof is the $X_H$ signal while the other is ground (zero signal level). $X_H$ is adjusted such that zero displacement is represented by a zero signal level.

The rebound hammer velocity $V_R$ enters into the computation of $T_{S1}$. $V_R$ is measured by means of a sample and hold circuit 178. The sampling event is the timing instant $T_{SO}$ which is obtained from the comparator 176. The circuit 178 then samples and holds the velocity $V_H$ which is the rebound velocity of the hammer. It was noted above that the rebound velocity $V_R$ is the slope of the hammer displacement at the time $T_{SO}$.

The instant $T_{S1}$ is determine utilizing the signal from the comparator indicating the time $T_{SO}$, the rebound velocity signal $V_R$ from the sample and hold circuit, the differential pressure signal $\Delta P$ and the control signal $e_B$. The $e_B$ control signal be varied by a potentiometer 180 so as to set the nominal blow energy (i.e., force pulse amplitude). The $K\Delta P$ signal is obtained from a difference amplifier 182 in the parameter generator 166. The instant $T_{S1}$ may be re-expressed in terms of the energy control signal $e_B$ and the differential pressure signal $\Delta P$ using Equation (3) as follows:

$$T_{S1} = -K_1 V_R/\Delta P + K_2/\Delta P \sqrt{e_B + K_S V_R^2} \qquad (8)$$

Equation (8) is implemented by a subsystem 184 in the timing generator 168. In this subsystem 184 the rebound velocity signals $V_R$ is inverted in an inverting operational amplifier 186 to provide $-V_R$. The signal is also applied to a squaring circuit 188 so as to provide $V_R^2$. The $V_R^2$ signal is added to the $e_B$ control signal in a summing circuit 192. The square root of the summing circuit 192 output is taken in a square root circuit 194. The square root circuit 194 output is summed with $-V_R$ in a summing circuit 200. The summing circuit 200 output is divided by the $\Delta P$ signal in a dividing circuit 198. The dividing circuit 198 provides the output proportional to the time difference between $T_{SO}$ and $T_{S1}$. The constants identified in equation (8) are accounted for by gain adjustments in the individual computational modules.

To define $T_{S1}$, a one-shot multi-vibrator 202 is used. The one-shot delay time is set by the output of the subsystem 184 taken from the dividing circuit 198 and applied to the control or C input of the one shot 202. The one-shot delay is initiated by the $T_{SO}$ signal which is applied to the trigger input T thereof. Accordingly, the one shot provides, at its Q output, the output pulse as a transition from a logical "0" to a logical "1" level at instant $T_{SO}$ followed, after the delay time determined by the subsystem 184, by a transition from a logical "1" to a logical "0".

The timing instant $T_{S2}$ is determined by the zero value for the velocity signal $V_H$. It is at this instant that the valve 172 can be returned to the center or off position. The $T_{S2}$ is obtained through the use of a comparator 204 which compares the velocity signal $V_H$ to zero (ground). The comparator 204 provides a level having a transition from "1" to "0" when $V_H$ passes through "0". An inverting amplifier 206 provides a positive logical transition from "0" to "1" at the timing instant $T_{S2}$.

The timing instant $T_{S3}$ is, as seen in FIGS. 19(b), the instant when the hammer is accelerated downwardly so as to generate the next force pulse. Rather than providing $T_{S3}$ at the instant when the next control pulse $e_R$ occurs, it is provided a delay $T_d$ after the occurrence of the $e_R$ pulse. This is done so as to stabilize the control system and allow sufficient time for the adjustment of the hammer's downward stroke, $X_S$, which varies with the blow energy signal $e_B$ and the accelerating force signal $K\Delta P$.

This delay time $T_d$ is obtained by estimating the hammer fall time $T_f$ for each $e_B$, corrected for the sensed values of $P_S$, $P_R$, and $X_S$, and subtracting the fall time and a fixed delay T, which is a fixed interval after occurrence of the control pulse $e_R$. Since the force pulses occur a fixed delay later than the control pulses, the only consequence is that the force pulses are transmitted a time delay T later than the control pulses which originate from the code generator 302 (FIG. 17).

The fixed delay thus has two portions, the delay time $T_d$ and the hammer fall time $T_f$. The delay time is expressed as $$T_d = T - T_f \qquad (9)$$

The hammer fall time may be derived from the energy relationships (see equations (2) and (5)) and is given by the proportionality $$T_f \propto \sqrt{e_B/P} \qquad (10)$$

Accordingly, the desired delay time is $$T_d = T - K_4 \sqrt{e_B/P} \qquad (11)$$

The relationship expressed in equation (11) is implemented by the analog circuitry consisting of a square root circuit 208, a dividing circuit 210, an inverting amplifier 212 and a summing circuit 214. The square root of the energy for blow level $e_B$ is derived by the square root circuit 208 and is divided by the pressure differential $K\Delta P$ in the dividing circuit 210. The sign is changed in the inverting amplifier 212 and applied to the summing circuit 214, wherein it is added to a level e corresponding to the fixed delay time T.

The output from the summing circuit is proportional to $T_d$ and sets the delay time of a one-shot multivibrator 216. The multivibrator is triggered by each $e_R$ pulse and generates the $T_{S3}$ timing instant as the transition from "0" to "1" in the level at the output of the one shot 216.

The "dither" signals at $T_{DT1}$ and $T_{DT2}$ which create a series of valve openings and reversals which cause the hammer to slowly move upward or downward, is derived using the energy for blow level $e_B$ and the accelerating force level which is indicated by $K\Delta P$ to determine the desired hammer stroke $X_S$. $X_S$ is determined by the following proportionality $$X_S \propto e_B/P \qquad (12)$$

The necessary adjustments for "dither" in the hammer height is obtained by comparing $X_S$ with the hammer displacement signal $X_H$ and developing dither signals of duration equal to the desired valve incremental opening time $T_o$. The sense of these dither signals, whether logical "1" or logical "0" then determines whether the control valve will be open in the forward direction (the first state) to provide upward acceleration to the hammer or reversed to provide downward acceleration to the hammer.

The desired stroke $X_S$ is obtained by dividing the energy per blow signal $e_B$ by the $K\Delta P$ signal in a dividing circuit 218. This desired stroke $X_S$ is subtracted from the actual hammer displacement $X_H$ through the use of a summing circuit 220 and an inverting amplifier 222. When the desired stroke is reached, the difference signal from the summing circuit 220 becomes equal to "0". The incremental dither signals at $T_{DT1}$ and $T_{DT2}$, which are digital signals are obtained by a dither signal generator 224. At the input of the generator 224 are a pair of comparators 226 and 228. Positive and negative reference voltages $+E_D$ and $-E_D$ establish a dead band equal to $2E_D$. When the input signal from the summing circuit 220 is of such an amplitude, either positive or negative, as is greater than the dead band, either the comparator 226 or the comparator 228 will provide an output. The dead band voltages $E_D$ are selected to be larger than the incremental dither step. Thus, hunting (alternate raising and lowering of the hammer which can waste power and cause unnecessary wear) is substantially eliminated.

The dither system 224 is provided with clock signals having a period equal to one-half the desired period $t_o$ of the dither step. These clock signals are applied to the clock inputs of four flip-flops 230 to be set by the next clock pulse (the first clock pulse in the dither sequence). The Q output of flip-flop 230 is applied, through an OR gate 240, an enabled AND gate 244 and an OR gate 242, to the input of the drive amplifier 170 which results in the UP or $+e_V$ command to the servo valve 172. The AND gate 244 is enabled between the timing instants $T_{S2}$ and $T_{S3}$ by means of a flip-flop latch 246. The output from the OR gate 240 thus provides the UP control dither signals $T_{DT1}$.

When flip-flop 230 is set, the AND gate 238 is inhibited. Another AND gate 248 is enabled. A NOR gate 250 also receives a logical "1" level which inhibits another AND gate 252. The down output from the downward control comparator 228 is thereby inhibited from causing a downward command, thus preventing the generation of conflicting valve control signals. The latter action is a precaution against any accidental reversal of valve control during the dither sequence.

The next clock pulse (the second clock pulse in the dither sequence) sets flip-flop 232. A down command is then applied to the negative input of the drive amplifier 170 by way of an OR gate 254 and AND gate 256, which is enabled during the period between $T_{S2}$ and $T_{S3}$ by the latch 246, and another OR gate 258. During the second clock pulse period, the NOR gate 250 receives a logical "1" input from the Q output of flip-flop 232 so that outputs from the comparator 228 continue to be inhibited by the AND gate 252. The second clock pulse also resets the flip-flop 230 and causes the UP command to be cancelled.

On the third clock pulse in the dither sequence, the flip-flop 232 is reset. It will therefore be observed that for the first clock pulse period the servo valve 172 is presented with an UP command ($+e_V$) and on the second clock pulse period by a down command, both during equal time increments $t_o/2$. The hammer then will have accelerated upwardly and then downwardy to zero velocity such that the valve can safely be closed. This completes one dither sequence with the hammer having moved incrementally upward. At the end of the sequence, the flip-flops 230 and 232 have returned to their reset states. If the UP command from the comparator 226 is still present, another upward dither sequence will be initiated and the hammer will have moved upwardly during the next clock pulse period when an upward acceleration command $+e_V$ is generated and then decelerated again to zero velocity during the succeeding clock pulse period such that the valve 172 can again be closed. It can be seen therefore that twice the clock pulse period is equal to a dither time increment. Thus, the hammer 60 is caused to move at a controlled rate, stepwise driving successive dither increments, until the desired elevation, and stroke $X_S$, is reached. Then, the output from both comparators 226 and 228 are logical zero levels.

The dither sequence which will cause the hammer to move incrementally downward (viz., lower the hammer) is obtained through the use of the flip-flop 234 and 236, the AND gate 252, another OR gate 258 and another NOR gate 260. The sequence of dither signals at instants $T_{DT2}$ and $T_{DT1}$ ($T_{DT1}$ follows $T_{DT2}$, for the DOWN dither sequence) is generated in a manner similar to that described above in connection with an UP dither sequence.

The control of the hammer 60 through the actuation of the servo valve 172 is obtained by applying the outputs of the one-shot 202 via the OR gates 24q and 258, to the drive amplifier 170. The one shot 202 output is a pulse having leading and trailing edges at $T_{SO}$ and $T_{S1}$, respectively. This pulse is grated by a pair of AND gates 264 and 266. From FIG. 19(b) and 26, it will be seen that the control of the valve 172 begins between $T_{SO}$ and $T_{S1}$ when the control valve 172 is opened in a forward direction so as to provide pressure differential with respect to the piston drive areas of the hammer 60 resulting in forces to drive the hammer in the upward direction. Between $T_{S1}$ and $T_{S2}$ the valve 172 is reversed so as to provide forces on the hammer to decelerate the hammer to approximately zero velocity. Between $T_{S2}$ and $T_{S3}$ the dither signals are generated. From $T_{S3}$ to the time of impact at $T_O'$, the valve 173 is opened again in the forward direction to drive the hammer down to impact position. Between $T_O$ and $T_{SO}$ the force is continued downward to provide the maximum energy delivery to the load.

The flip-flop 246 is set at $T_{S3}$ such that the Q output level thereof enables the AND gate 263 and 266. The positive logical "1" level from the Q output of the one shot 202 is then applied at $T_{SO}$, via the AND gate 264 and the OR gate 242, to generate a $+e_V$ control signal which opens the servo valve 172 in the forward direction to produce the forces which drive the hammer 60 upwardly. At $T_{S1}$ and $\bar{Q}$ output of the one shot 202 becomes a logical "1" level and passes through the enabled AND gate 266 and the OR gate 258 to the minus input of the amplifier 170. A $-e_V$ control signal is then generated and applied to reverse the servo valve 172. At $T_{S2}$ the flip-flop 246 is reset such that both of the gates 264 and 266 are inhibited. This reset takes place when the hammer reaches zero velocity, as determined by a negative transition in the level from the comparator 204. The inverting amplifier 206 provides a positive signal at $T_{S2}$ which resets the flip-flop 246. Then the dither signals at $T_{DT1}$ and $T_{DT2}$ are applied to adjust the position of the hammer to the height $X_S$, which will deliver the requisite blow energy dictated by $e_B$ on the next impact.

At $T_{S3}$ the flip-flop 246 is reset and the AND gates 264 and 266 are again enabled. Since the Q output of the one shot 202 is then a logical "1", it passes through the enabled AND gate 266 and the OR gate 258 so as to generate the $-e_V$ signal which causes the hammer to be driven downward to impact for the impact time which extends from $T_O$ to $T_{SO}$. At $T_{SO}$ the next force pulse in the sequence is generated.

Referring to FIG. 21, the code control system 299 stores the code for the transmission in a non-volatile memory 1001, such as read-only memory. The time for each impulse in accordance with the code is stored in as a digital number, in sequence, and the impulse amplitude of each such impulse is also stored as another digital number in the memory 1001. In many cases, the latter numbers will all have the same value.

At the beginning of transmission, the contents of the ROM 1001 is transferred on a one-to-one basis into a main read-write memory 1002, which may be a core or semi-conductor memory. This memory 1002 contains digital numbers for the times and amplitudes of the impulses in accordance with the "corrected" code, which will assume values which will cause the sources S1 to S4 to transmit the best possible replica of the desired code, as stored in the ROM 1001. The memory 1002 receives inputs from the error corrector 304 from which the corrected codeis obtained. Before a transmission begins, the best corrected code will be taken as the desired code itself. As operations progress, the error corrector 304 obtains the errors between the desired code and the transmitted code which are measured and corrections made to the corrected code, to eventually reach an optimized transmission.

At time, $fr_1$, a transmission is begun. A clock counter 1009, which is driven by a master clock source 1008, a code pulse counter 1003, and a two-stage address counter 1011, which outputs the addresses of the sources, are reset to zero by a reset signal occurring at $fr_1$. The leading edge of this reset signal starts the transmission and enables the transfer from the read only memory 1001 to the main memory 1002. The code address for the first pulse, which has a time of zero, is then inputted to the memory 1002. The zero from the read lines 999 of the memory 1002 and the zero from the clock counter cause a coincidence detector, in the form of a digital comparator 1010, to be satisfied, and the comparator 1010 produces a transmit pulse. The clock counter 1009 begins indexing at the rate set by the master clock 1008, and after one clock count, coincidence is lost. Following two delays, to be discussed shortly, but prior to the desired time of the next impulse from S2, the memory address from the code pulse counter 1003 will be indexed to '1', providing, on the read lines 999, the time of the second pulse. When the clock counter reaches this time, a second coincidence will be obtained, causing the transmission of a second pulse. This sequence continues for the remainder of the code.

At each transmit command, the two-stage counter 1011 indexes one count. The source addresses from the counter and the transmit commands for the impulses and their corresponding amplitude data are applied to the source controllers 300. Hence, on the first pulse, the source address "00" causes demultiplexers 1047 and 1048 of the controllers 300 to direct the transmit commands to source S1, and on the second pulse, the counter address "01" causes source S2 to be selected, etc., through source S4, at which time, on the fifth pulse, the address "00" is again present and source S1 is again selected.

The code is generated and the transmission operations proceed in accordance therewith. Code corrections are provided by means of the error corrector 304.

The code correction process begins with the receipt of the actual transmitted signals from the sources S1 through S4. The outputs of the transducers T-1 to T-4 illustrated here as analog signals are received from hydrophones located near each source (see FIG. 17), and provide signals to be used for two types of corrections. The first use is for the correction of the code itself; the second is to cause the sources to operate as "matched pairs", creating a pulled third harmonic signal.

To provide code correction, the analog signals first are multiplexed by an analog multiplexer 1035 so that the signal from the source presently transmitting is selected for processing. The signal is differentiated by a differentiating circuit 1036 to provide an indication of the abrupt slope reversal of the sound pressure signature which occurs at the instant of transmission. The derivative signal resides at a large positive value as the instant of transmission approaches, and then falls to an equally large neative value after transmission. The point of zero value for the derivative represents the time of the peak of the pressure pulse, and is sensed by a comparator 1037.

The pressure signals from the multiplexer 1035 are amplified by an adjustable gain amplifier 1040, which is set so that the signal from a properly operating source assumes a defined value at the output of the amplifier 1040. Adjustment of this gain alters (perturbs) the "reference" amplitude desired from each source. This signal is sampled at the peak amplitude, and held by a sample and hold circuit (S&H) 1039 for conversion to digital form in an analog to digital converter (ADC) 1043. The digital signals $e_{pc}$ from the ADC 1043 are digital representations, pulse-by-pulse, of the peak amplitudes transmitted by each source.

The amplitude, as represented by the digital signals, $e_{pc}$, and the code amplitude digital signal from the ROM 1001 are subtracted from each other in subtract arithmetic logic 1006. The difference is the error between the desired code pulse amplitude and the actual source output. The error is divided by an appropriate constant, typically about 8, in dividing logic 1045 and added in an adder 1041 to the pulse amplitude commanded by the corrected code read out of the main memory 1002. The division constant represents the loop gain of a servo system and avoids instability.

The new value for the corrected code from the adder 1041 at the time of a delayed pulse from a delay circuit, e.g, a one-shot, which provides a "write" command to the main memory 1002, causing the corrected pulse amplitude to be overwritten in the main memory 1002. The corrected codes for the impulse amplitudes are thereby obtained and stored in the main memory 1002.

To correct the transmission times to comply with the code, the desired code transmission times are read from the ROM 1001 at the time of each memory address, and compared with the times from the clock counter 1009 by comparator 1015. At coincidence, a pulse is obtained which precedes the desired transmission time by the source fall time. The fall time is provided by an adjustable delay circuit 1012, which is set to coincide with the fall time of the source. This fall time is a function of the design of the source. At the instant of this delayed pulse, a properly operating source will be at its peak amplitude, and the differentiated signal from the differentiator 1036 will be passing through zero. A sample and hold circuit 1038 measures the differentiated signal at this instant, and consequently develops an error signal representing the difference between the desired source impact time and the actual source impact time. The error signal is converted to digital form ($P_cp_c$) in an ADC 1044, divided by 8 in a divider 1046 for loop stability, and added in an adder 1007 to the pulse command time which is presented by the main memory 1002 on read lines 999. The new value for the command time is overwritten into the main memory 1002 at the same write time (of the write command from the delay circuit 1005) as the amplitudeoverwrite.

The desired code in ROM 1001 is transformed into a corrected code in the main memory 1002, so that after sufficient operating time, the corrected code is perturbed and compensated for all systematic system errors.

To generate a code with low side lobe level, the third haromonic components from the sources cancel and as discussed above, reduce the third harmonic in the transmitted signal to substantially zero amplitude. Two pairs of the four sources are identified, in accordance with a feature of the code control system 299, whose third harmonics substantially cancel each other. While all four source can produce idential third harmonic components with precisely controlled phase angles such that the vectors add to zero, it is sufficient and provides for simplification in the implementation of the control system 299 to control the sources in pairs.

Specifically, the sources which are to be paired to cancel each other's harmonics are the pair which operate displaced 60° in phase with each other, and the pair which provide a second harmonic augmentation. The sources which provide the second harmonic pair can be thought of as being displaced 180° with respect to each other. In the natural pulse sequence, these pairs are identified as S1 with S2, and S3 with S4.

The objective of this source correction process is to adjust the amplitude and phase of one of the two sources in a pair so that the sum of the third harmonic components of this pair is zero. The amplitude and phase adjustment in this case takes place at the variable gain amplifiers (VGA) 1054 and 1055 and at the variable time delays (VTD) 1056 and 1057 in the source controllers 300.

The first requirement in deriving an error signal is to measure the third harmonic amplitude and phase from each source. This is done by first passing each source transducer signal through variable bandpass filters (BPF) 1019 to 1022 centered on the third harmonic. The filter frequency control is derived from a 4:1 divider 1013, as may be implemented by a counter and a frequency-to-voltage converter 1014 such as may be implemented by a one shot and an averaging circuit, which produce a voltage proportional to the fundamental frequency being transmitted.

Alternatively, four tracking filters can be used in place of the bandpass filters and the control voltage generator (divider 1013 and converter 1014). The tracking filters are locked to the third harmonic, and each have identical frequency, phase, and control characteristics to assure that the filters do not in themselves produce errors. In the preferred embodiment, as shown, errors in the control system are common to all four sources, so that any error in frequency control is cancelled by the system.

The third harmonic components of sources S1 and S2 are subtracted as in a difference amplifier 1023 and similarly the third harmonic components of sources S3 and S4 are subtracted in difference amplifier 1024. The difference signals will be nulled for properly matched sources, and will provide an error signal for improperly matched sources. Multipliers 1025 and 1026 correlate the in phase error signal with the output of one of the source pairs. Ninety degree phase shifters 1027 and 1028 obtain quadrature components of the reference source outputs. Multipliers 1029 and 1030 correlate these quadrature components with the error signal. The inphase error signals $ec_{1-2}$ and $ec_{3-4}$ arise from an inaccurate amplitude match between the paired sources, while the quadrature error signals $Pc_{1-2}$ and $Pc_{3-4}$ indicate a phase error. The multiplier outputs provide error signals which can be used to correct the amplitude or the phase of one source relative to its mate so that the error signal is substantially eliminated.

Averaging circuits 1031 to 1034 remove the high frequency undulations from these error signals and provide smoothly varying signals. These signals are applied to the VGA's 1054 and 1055 and the VTD's 1056 and 1057 to provide the desired correction between the sources.

In operation, the portions of the dynamic error correction 304 using the third harmonic measurement as just described matches sources and reduces dynamic errors between the sources. The residual errors are sensed by the other portions of the error corrector 304, which will gradually change the corrected code to eliminate the error over a long time period. The dynamic correction between source reduces errors caused by such factors as operational variations, which will not repeat from code transmission to code transmission, but randomly occur in time frames of a few fundamental frequency periods.

From the foregoing description it will be apparent that improved methods and apparatus for the generation and transmission of signals for echolocation and particularly seismic signals for geophysical exploration have been described. Presently preferred embodiments of these methods and apparatus have been described to illustrate the invention and variations and modifications thereof within the scope of the invention will undoubtedly suggest themselves to those skilled in the art. The foregoing description should therefore be taken as illustrative and not in a limiting sense.

What is claimed is:

1. The method of transmitting a sequence of signals, each of which has a spectrum extending over a frequency range of more than one octave, with the sequence of said signals having substantialy constant spectral energy extending smoothly over said range, which comprises the steps of
   generating repeatedly successions of said signals, which signals divide the duration of each of said successions in the same proportion, and
   changing the duration of each of said successions during the transmission of said sequence with the ratio of the duration of the longest succession to the duration of the shortest succession in the sequence not exceeding a factor of two-to-one.

2. The invention as set forth in claim 1 wherein said generating step is carried out to produce each of said signals with a spectrum which extends over said frequency range.

3. The invention as set forth in claim 1 wherein said signals are pulses.

4. The invention as set forth in claim 1 wherein the changing of the duration of each of said successions is carried out slowly over the interval of said transmission.

5. The invention as set forth in claim 4 wherein the slow changing of the duration of each of said successions take place monotonically over said transmissions interval.

6. The invention as set forth in claim 1 wherein said proportion is made up of equal parts of equal length in time.

7. The invention as set forth in claim 1 wherein said proportion is made up of parts of unequal length in time.

8. The invention as set forth in claim 6 wherein there are N signals in each succession.

9. The invention as set forth in claim 8 wherein said signals in each of said successions are seven in number.

10. The invention as set forth in claim 8 wherein said generating step is carried out by generating N trains of said signals which divide the period of the first train into successively greater numbers of equal parts, successive periods of said first train of signals being equal to the durations of said successions, and said duration changing step is carried out by sweeping the repetition frequency of said trains over bands each not exceeding an octave.

11. The invention as set forth in claim 10 including the step of controlling the amplitude and timing of the signals in said trains with respect to the amplitude of the signals in said first train such that spectral components of said sequence at non-octave harmonics are reduced in amplitude and the spectral components of said sequence at octave harmonics are increased in amplitude to provide said sequence with said spectrum of substantially constant energy.

12. The invention as set forth in claim 11 wherein said amplitude controlling step controls the amplitudes of the signals in said trains such that the spectral components which are at the octave harmonics are respectively about $\sqrt{n}$ times the amplitude of the spectral components of the fundamental, where n is the harmonic number, and the spectral components at the non-octave harmonics are substantially eliminated.

13. The invention as set forth in claim 12 wherein N is equal to seven and the amplitudes and polarity of said spectral components is as set forth in Table 1 where the components specified as having phases of 0° and 180° are of opposite polarity.

14. The invention as set forth in claim 7 wherein two of said parts are provided, one of said parts being of length about 1/6th and the other 5/6ths of the length of said duration.

15. The invention as set forth in claim 7 wherein a plurality of said parts are defined by certain of said signals which effectively divide each said durations into parts one of which is 1/6th of the total length of said durations.

16. The invention as set forth in claim 7 wherein said durations have, in terms of a total length of 360° each, said parts in about the following proportion 60°:20.5°:180°:99.5°.

17. The invention as set forth in claim 7 wherein said durations have, in terms of a total length of 360° each, said parts in about the following proportion 60°:25.5°:180°: 94.5°, and including the step of adjusting the amplitude of the third and fourth signals in each said succession to be about 1.31 times the amplitude of the first and second signals in each said succession.

18. The invention as set forth in claim 7 wherein said generating step is carried out such that said durations have, in terms of a total length of 360° each, said parts in the following proportion 30°:180°:90°:30°:30°:, and said signals have equal amplitude and are located with a first of said signals at about 0°, a second, third and fourth of said signals at about 30°, a fifth and sixth of said signals at about 210°, a seventh of said signals at about 300° and an eighth of said signals at about 330°.

19. The invention as set forth in claim 7 wherein said generating step is carried out such that said durations have, in terms of a total length of 360° each, said parts in the following proportion 30°:180°:90°:30°:30°, and including the step of adjusting the amplitude of said signals such that a first of said signals has a first amplitude and is at about 0°, a second of said signals has said first amplitude and is at about 30°, a third and fourth of said signals each have a second amplitude twice said first amplitude and is at about 30°, a fifth and sixth signal have said second amplitude and are at about 210°, a seventh signal has said first amplitude and is at about 300°, and an eighth of said signals has said first amplitude and is at about 330°.

20. The invention as set forth in claim 1 including the step of controlling the amplitude of the signals in each of said successions such that said signals have a certain amplitude relationship, with said amplitude relationship being the same in each of said successions.

21. The invention as set forth in claim 1 including the step of propagating said sequence into a receiving medium, such as an earth formation for location of geophysical reflection surfaces.

22. The invention as set forth in claim 21 wherein said signals are pulses and said generating step includes the step of shaping said pulses such that their spectral energy is constrained to the frequency range which is useful for said echolocation purposes.

23. The invention as set forth in claim 22 wherein said shaping step is carried out by controlling the width of said pulses to be approximately equal to 0.6 times the reciprocal of the uppermost frequency of said echolocation frequency range.

24. The invention as set forth in claim 7 wherein said generating step is carried out by generating said signals in a plurality of trains, each train having the same repetition frequency and being in predetermined time relationship with each other train, and wherein said duration changing step is carried out by sweeping the repetition frequency of said trains progressively over a band not exceeding an octave.

25. Signalling apparatus for transmitting a sequence of signals, each of which has a spectrum extending over a frequency range of more than one octave, with the sequence of said signals having substantially constant energy extending smoothly over said range which comprises means for generating repeatedly successions of said signals which divide the duration of each of said successions in the same proportion, and means for changing the duration of each of said successions by a factor not exceeding two to one during the transmission of said sequence with the proportion into which each of said successions is divided remaining the same.

26. The invention as set forth in claim 25 wherein said generating means is operative to produce each of said signals with a spectrum which extends over said frequency range.

27. The invention as set forth in claim 26 wherein said signals are pulses.

28. The invention as set forth in claim 25 wherein said means for changing of the duration of each of said successions is operative to change said duration slowly over the interval of said transmission.

29. The invention as set forth in claim 28 wherein said means for slowly changing the duration of each of said successions is operative to cause said changing to take place monotonically over said transmission interval.

30. The invention as set forth in claim 25 wherein said proportion is made up of equal parts of equal length in time.

31. The invention as set forth in claim 25 wherein said proportion is made up of parts of unequal length in time.

32. The invention as set forth in claim 30 wherein there are N signals in each succession.

33. The invention as set forth in claim 32 wherein said signals in each of said successions are seven in number.

34. The invention as set forth in claim 32 wherein said generating means is operative for generating N trains of said signals which divide the period of the first train into successively greater numbers of equal parts successive periods of said first train of signals being equal to the durations of said successions, and said duration changing means is operative to sweep the repetition frequency of said trains over bands each not exceeding an octave.

35. The invention as set forth in claim 34 including means for controlling the amplitude and timing of the signals in said trains with respect to the amplitude of the signals in said first train such that spectral components of said sequence at non-octave harmonics are reduced in amplitude and the spectral components of said sequence at octave harmonics are increased in amplitude to provide said sequence with said spectrum of substantially constant energy.

36. The invention as set forth in claim 35 wherein said amplitude controlling means controls the amplitudes of the signals in said trains such that the spectral components which are at the octave harmonics are respectively about $\sqrt{n}$ times the amplitude of the spectral components of the fundamental wherein n is the harmonic number, and the spectral components at the non-octave harmonics are substantially eliminated.

37. The invention as set forth in claim 36 wherein n is equal to seven and the amplitudes and polarity of said spectral components is as set forth in Table 1 where the components specified as having phases of 0° and 180° are of opposite polarity.

38. The invention as set forth in claim 31 wherein two of said parts are provided, one of said parts being of length about 1/6th and the other 5/6ths of the length of said duration.

39. The invention as set forth in claim 31 wherein a plurality of said parts are defined by certain of said signals which effectively divide each said durations into parts one of which is 1/6th of the total length of said durations.

40. The invention as set forth in claim 31 wherein said durations have, in terms of a total length of 360° each, said parts in about the following proportion 60°:20.5°:180°:99.5°.

41. The invention as set forth in claim 31 wherein said durations have, in terms of a total length of 360° each, said parts in about the following proportion 60°:25.5°:180°:94.5°, and including means for adjusting the amplitude of the third and fourth signals in each of said successions to be about 1.31 times the amplitude of the first and second signals in each of said successions.

42. The invention as set forth in claim 31 wherein said generating means produces said successions such that said durations have, in terms of a total length of 360° each, said parts in the following proportion 30°:180°:90°:30°:30° and said signals have equal amplitude and are located with a first of said signals at about 0°, a second, third and fourth of said signals at about 30°, a fifth and sixth of said signals at about 210°, a seventh of said signals at about 300° and an eighth of said signals at about 330°.

43. The invention as set forth in claim 31 wherein said generating means produces said successions such that said durations have, in terms of a total length of 360° each, said parts in the following proportion 30°:180°:90°:30°:30°, and including the means for adjusting the amplitude of said signals such that a first of said signals has a first amplitude and is at about 0°, a second of said signals has said first amplitude and is at about 30°, a third and fourth of said signals each have a second amplitude twice said first amplitude and is at about 30°, a fifth and sixth signal have said second amplitude and are at about 210°, a seventh signal has said first amplitude and is at about 300°, and an eighth of said signals has said first amplitude and is at about 330°.

44. The invention as set forth in claim 25 including means for controlling the amplitude of the signals in each of said successions such that said signals have a certain amplitude relationship, with said amplitude relationship being the same in each of said successions.

45. The invention as set forth in claim 25 including means for propagating said sequence into a receiving medium, such as an earth formation for location of geophysical reflection surfaces.

46. The invention as set forth in claim 45 wherein said signals are pulses and said generating means includes means for shaping said pulses such that their spectral energy is constrained to the frequency range which is useful for said echolocation purposes.

47. The invention as set forth in claim 46 wherein said shaping means is operative for controlling the width of said pulses to be approximately equal to 0.6 times the reciprocal of the uppermost frequency of said echolocation frequency range.

48. The invention as set forth in claim 31 wherein said generating means is operative for generating said signals in a plurality of trains each train having the same repetition frequency and being in predetermined time relationship with each other train and wherein said duration changing means is operative for sweeping the repetition frequency of said trains progressively over a band not exceeding an octave.

49. The method of transmitting a sequence of signals, said sequence having a spectrum extending over a frequency range of more than one octave, which comprises the steps of generating trains of quasi-repetitive signals, each signal having a spectrum which includes said range, with the repetition frequency of said signals in said trains sweeping over frequency bands during the transmission of said sequence, each band not exceeding an octave in said range, and controlling the timing relationship of the signals of said sequence such that the spectrum of said sequence of signals has substantially constant spectral energy extending smoothly over said range.

50. The invention as set forth in claim 49 wherein said frequency bands are one and the same band.

51. The invention as set forth in claim 49 wherein each of said frequency bands extends over an octave, and wherein the octaves over which said trains sweep are harmonically related, the octave over which said first train sweeps being the first or fundamental octave.

52. The invention as set forth in claim 51 wherein said controlling step is carried out by controlling the generation of the signals in each of said trains in a predetermined phase relationship such that said trains of signals are phase locked and in synchronism with each other.

53. The invention as set forth in claim 52 and further comprising the step of controlling the generation of the signals in each of said trains in a predetermined amplitude and phase relationship such that those spectral components of the signals which are generated by all of said trains which are at frequencies which are octave harmonics of said first octave are adjusted in amplitude to provide said substantially constant spectral energy while those spectral components which are at non-octave harmonics of said first octave are reduced in amplitude.

54. The invention as set forth in claim 53 wherein said generating step is carried out such that said trains comprise said first train which sweeps over said first octave, a second through N trains which sweep over second through N harmonics of said first octave respectively, wherein the desired frequency range of the echolocation or signalling system has a ratio of the highest frequency to the lowest frequency of (N=1), and wherein said amplitude and phase controlling steps control the amplitudes of said signals in said trains such that the spectral components which are at the octave harmonics, are respectively about $\sqrt{n}$ times the amplitude of said spectral components in said fundamental octave, where n is the harmonic number, and the spectral components at the non-octave harmonics are reduced so as to be substantially eliminated.

55. The invention as set forth in claim 54 wherein said signals are pulses, wherein N equals 7, and wherein said signals are pulses, said amplitude controlling step is carried out to provide amplitudes for said pulses of said trains such that the ratios of amplitudes of the pulses of said second through seventh trains to the amplitude of the pulses of said first train are approximately as follows: said second train, 0.207; said third train, 0.333; said fourth train, 0.146; said fifth train, 0.2; said sixth train, 0.402; and said seventh train, 0.143, and wherein said phase controlling step is carried out to provide phases for said pulses of said trains such that the relative phases of the fundamental spectral component of the pulses of the second through seventh trains with respect to the phase of the corresponding harmonic spectral components of the first train are approximately as follows: said second train, 0°; said third train, 180°; said fourth train, 0°; said fifth train, 180°; said sixth train, 180° said seventh train, 180°.

56. The invention as set forth in claim 50 wherein said controlling step is carried out by phasing said trains such that spectral components of the signals which are generated by all of said trains which are at non-octave harmonics of said first train octave are reduced in amplitude.

57. The invention as set forth in claim 56 wherein said controlling step is carried out by generating the signals in each of said trains in a predetermined phase relationship with respect to the signals in said first train such that said spectral components at the non-octave harmonics are reduced in amplitude and the spectral components which are at octave harmonics are adjusted in amplitude to provide said substantially constant spectral energy.

58. The invention as set forth in claim 57 including the step of controlling the amplitude of said signals in each of said trains to be at about the same amplitude.

59. The invention as set forth in claim 58 wherein said generating step provides as said trains said first train and a second train, and said controlling step is carried out by phasing said second train such that the fundamental spectral component of said second train is approximately 60° displaced in phase relative to the fundamental spectral component of said first train, whereby the amplitude of the spectral component of the sum of said first and second trains at frequencies which are at the third harmonic octave of said octave over which said first train sweeps is reduced in amplitude.

60. The invention as set forth in claim 59 wherein said generating step is carried out to provide, as said trains, said first and second trains together with third and fourth trains, and said controlling step is carried out by phasing said third and fourth trains such that the fundamental spectral components of said third and fourth trains are at phase displacements of approximately 80.5° and 260.5°, respectively, with respect to the phase of the fundamental spectral component of said first train, and whereby the spectral components of the signals which are generated by said first through fourth trains at frequencies which are third harmonics of the octave of the said range over which said trains sweep are reduced in amplitude so as to be substantially eliminated and the spectral components which are at second and fourth harmonics of said octave are augmented in amplitude so as to be about $\sqrt{2}$ times the amplitude of the fundamental component in the case of the second harmonic octave spectral component and 2 times the amplitude of the fundamental component in the case of said fourth harmonic spectral component.

61. The invention as set forth in claim 57 wherein said generating step is carried out to provide, as said plurality of trains, said first trains together with second, third and fourth trains, and said controlling step is carried out by phasing said second and fourth trains at a displacement of approximately 85.5° and 265.5° with respect to said first train and by phasing said second train at a displacement of approximately 60° with respect to said first train, and including the step of controlling the amplitude of said signals such that the amplitude of the signals in said first and second trains are equal and the amplitude of the pulses in said third and fourth trains is 1.31 times the amplitude of the pulses in said first train whereby the spectral components of the signals which are generated by said first through fourth trains at frequencies which are third harmonics of the octave of the said range over which said trains sweep is reduced in amplitude so as to be substantially eliminated and the spectral components which are at second and fourth harmonics of said octave are augmented in amplitude so as to be about $\sqrt{2}$ times the amplitude of the fundamental component in the case of the second harmonic octave spectral components and 2 times the amplitude of the fundamental component in the case of said fourth harmonic spectral components.

62. The invention as set forth in claim 57 wherein said generating step is carried out to provide, as said trains, said first train together with said second through said eighth trains all of which sweep in frequency over the same first octave of said range, and wherein said controlling step is carried out by phasing said second through eighth trains such that the fundamental spectral components of said second through eighth trains are at phase displacements with respect to the phase of the fundamental component of said first train as follows:

| Train Number | Phase Angle |
|---|---|
| 2 | 30° |
| 3 | 30° |
| 4 | 30° |
| 5 | 210° |
| 6 | 210° |
| 7 | 300° |
| 8 | 330° | whereby the spectral components generated by said first through eighth trains at third and fifth harmonics of said first octave are reduced in amplitude so as to be substantially eliminated and the spectral components which are at said second and fourth harmonics of said first octave are augmented in amplitude to be about $\sqrt{2}$ times the amplitude of said fundamental component in the case of said second harmonic and about 2 times the amplitude of said fundamental component in the case of said fourth harmonic.

63. The invention as set forth in claim 57 wherein said generating step is carried out to provide as said trains said first train, second through fourth trains which sweep in frequency over the same first octave as said first source, and a fifth train which sweeps in frequency over a second octave over a range which is the second harmonic of said first octave, and wherein said controlling step is carried out by phasing said second, third and fourth trains such that the phases of the fundamental components of said trains are at displacements of approximately 30°, 300°, and 330°, respectively, with respect to the phase of the fundamental component of said first train and by phasing said fifth train such that the phase of the fundamental component of said train is at a displacement of 30° with respect to the fundamental component of said first train, and including the further step of controlling the amplitude of said signals such that the signals in said first through fourth trains are about equal to each other and the signals in said fifth train at about twice the amplitude of said first through fourth train signals whereby the spectral components generated by said first through eighth trains at third and fifth harmonics of said first octave are reduced in amplitude so as to be substantially eliminated and the spectral components which are at said second and fourth harmonics of said first octave are augmented in amplitude to be about $\sqrt{2}$ times the amplitude of said fundamental spectral component in the case of said second harmonic and about 2 times the amplitude of said fundamental spectral component in the case of said fourth harmonic.

64. The invention as set forth in claim 49 wherein said generating step includes the step of shaping said signals in said plurality of trains to constrain their spectral energy to said frequency range which is used by said echolocation system.

65. The invention as set forth in claim 64 wherein said signals are pulses and said shaping step is carried out by controlling the duration of said pulses to be approximately equal to 0.6 times the reciprocal of the uppermost frequency of said range.

66. For use in echolation systems for seismic exploration, the method of generating from signals having broad bandwidth which extend over a frequency range used in such systems, a transmission having an autocorrelation function in which side lobes are substantially suppressed, said method comprising
deriving said signals from a plurality of sources operating in harmonically locked relationship with each other, each source transmitting a slowly varying, quasi-repetitive train of signals,
sweeping the repetition frequency of said signals from said sources over N frequency bands within said range, said bands not exceeding one octave and N being an integer including one, and
timing the transmissions from said sources to be in such phase relationship that harmonics of the signals from any of said sources which are produced more than once are suppressed.

67. The invention as set forth in claim 66 wherein said sources produce said signals in the form of pulses.

68. The invention as set forth in claim 66 wherein said sweeping step is carried out during the same transmission interval which is long as compared to the longest period between the signals from said first source.

69. The invention as set forth in claim 68 including the step of controlling the amplitudes of the signals from all of said sources such that the spectral components which are at frequencies which are octave harmonics of the octave over which the signals from said first source sweep are augmented in amplitude to be approximately $\sqrt{n}$ times the amplitude of the signals from said first source where n is the order of said octave harmonics, and the amplitudes of the spectral component which are at frequencies which are non-octave harmonics are reduced whereby to suppress said harmonics of said first source signals which are produced more than once.

70. The invention as set forth in claim 69 wherein said sweeping step is carried out by causing said N bands to extend over successively higher octaves of the first or fundamental octave over which said first source sweeps, and the step of controlling the amplitudes of the signals from said sources is carried out to provide said signals from said sources of different amplitude and polarity, said signals of those of sources which sweep over bands which are octave harmonics of said first octave being of the same polarity as the signals from said first source and the signals of those of said sources which sweep over bands which are non-octave harmonics of said first octave being of opposite polarity to the signals from said first source.

71. The invention as set forth in claim 68 wherein said sweeping step is carried out by causing said N bands to be a single band which extends over an octave on the lower end of said range, and said timing step includes phasing the signals from the other of said plurality of sources with respect to the signals from said first source such that the spectral components which are at said non-octave harmonics are suppressed and the spectral components which are at said octave harmonics are augmented in amplitude.

72. In an echolocation system for seismic exploration, apparatus for generating a sequence of signals having a bandwidth extending over the frequency range used in such systems to provide a transmission having an autocorrelation function in which side lobes are substantially suppressed, said apparatus comprising
a plurality of sources of said signals operating in harmonically locked relationship with each other,
means for operating said sources to sweep the repetition frequency of said signals over N bands within said range, said bands not exceeding an octave and N being an integer, including one, and
means for timing the transmissions from said sources to be in such phase relationship that harmonics of the signals from any of said sources which are produced more than once are suppressed.

73. The invention as set forth in claim 72 wherein said sources have means for producing said signals in the form of pulses.

74. The invention as set forth in claim 72 wherein sweep means is operative to sweep the repetition frequency of said signals for each said source over said bands during the same transmission interval which is long as compared to the longest period between the signals from a first of said plurality of sources.

75. The invention as set forth in claim 74 including means for controlling the amplitudes of the signals from all of said sources such that the spectral components which are at frequencies which are octave harmonics of the octave over which the signals from said first source sweep are augmented in amplitude to be approximately $\sqrt{n}$ times the amplitude of the signals from said first source where n is the order of said octave harmonics, and the amplitudes of the spectral components which are at frequencies which are non-octave harmonics are reduced whereby to suppress said harmonics of said first source signals which are produced more than once.

76. The invention as set forth in claim 75 wherein said sweep means sweeps said N bands over successively higher octaves of the first or fundamental octave over which said first source sweeps, and said controlling means is operative to provide said signals from said sources with signals from those of said sources which sweep over bands which are octave harmonics of said first octave being of the same polarity as the signals from said first source and the signals of those of said source which sweep over bands which are non-octave harmonics of said first octave being of opposite polarity to the signals from said first source.

77. The invention as set forth in claim 74 wherein said sweep means provides said N bands or a single band which extends over an octave in the lower end of said range, and said sequencing means is operative to phase the signals from the other of said plurality of sources with respect to the signals from said first source such that the spectral components which are at said non-octave harmonics are suppressed and the spectral components which are at said octave harmonics are augmented in amplitude.

78. A system for transmitting signals which are useful in location of objects when said signals are received after reflection from said objects, said system comprising a plurality of sources for generating and transmitting pulses when operated, control means coupled to said sources for operating said sources upon command to generate said pulses, code generator means coupled to said control means for producing during a transmission interval commands in predetermined time relationship for operating each said sources to produce a separate quasi-repetitive train of said pulses from each of said sources, each of which trains sweep over an octave in repetition frequency and are locked in phase relationship such that harmonics of octaves over which said sources sweep which are produced more than once are suppressed.

79. The invention as set forth in claim 78 wherein signals are seismic signals and said sources each include means for providing impact events to produce said pulses, and means for shaping said pulses such that they have a spectrum extending over a frequency range containing a plurality of the octaves, the first and lower most one of which is the octave over which the first of said sources sweeps.

80. The invention as set forth in claim 79 wherein said impact event producing means includes a pair of members at least one of which is movable with respect to the other into impacting relationship, and said shaping means includes spring means coupled to at least one of said members.

81. The invention as set forth in claim 79 wherein said signals are seismic signals and said sources each include at least one movable member for generating said pulses, said control means comprises electrohydraulic means responsive to electrical signals for controlling the flow of pressurized hydraulic fluid for actuating said one member.

82. The invention as set forth in claim 81 wherein said code generator means includes means having storage for electrical signals representing said commands, and means for reading said electrical command signals from said storage means out to said control means.

83. The invention as set forth in claim 82 wherein said control means includes means for controlling the motion of said one member so as to control the amplitude of said impact event and the amplitude of the pulse resulting therefrom, said storage means having storage for electrical signals corresponding to said command signals and representing the amplitudes of each of said pulses, and means included in said code generator means for reading out said amplitude signals together with said command signals to said control means.

84. The invention as set forth in claim 83 further comprising error correcting control means and responsive to the pulses generated by said sources for varying the timing of said commands to reduce differences between the times of occurrence of said commands and the times of generation of said pulses in the quasi-repetitive trains, other than by a fixed value.

85. The invention as set forth in claim 84 including a plurality of sensors, a different one of said plurality of sensors being disposed with respect to a different one of said plurality of sources to derive the pulses generated therefrom, said sensors providing signals corresponding to said pulses generated by said sources to said error correcting means. pg,107

86. The invention as set forth in claim 85 wherein said sources include means operative to vary the amplitude of the said pulse generated and transmitted therefrom, said control means including means for controlling said amplitude varying means in response to amplitude control commands, said code generator means having means for generating amplitude control commands corresponding to said operating commands and applying both said commands concurrently to said control means, and wherein said error correcting means includes means responsive to the signals from said sensors for varying said amplitude commands to reduce the difference between the amplitude of said pulses and the amplitude commands corresponding thereto.

87. The invention as set forth in claim 86 wherein said signals are seismic signals and said error correcting means includes tracking filters connected to said sensors for deriving signals corresponding to the third harmonic of the repetition frequency of said impulses, and means operated by said code generator means for providing steering signals to said filters so that the center frequency of said filters tracks said third harmonic as said third harmonic octave is swept.

* * * * *